(12) United States Patent
Jiao et al.

(10) Patent No.: US 7,928,990 B2
(45) Date of Patent: Apr. 19, 2011

(54) GRAPHICS PROCESSING UNIT WITH UNIFIED VERTEX CACHE AND SHADER REGISTER FILE

(75) Inventors: Guofang Jiao, San Diego, CA (US);
Chun Yu, San Diego, CA (US); Yun Du, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 672 days.

(21) Appl. No.: 11/535,809

(22) Filed: Sep. 27, 2006

(65) Prior Publication Data

US 2008/0074430 A1    Mar. 27, 2008

(51) Int. Cl.
*G09G 5/36* (2006.01)
(52) U.S. Cl. ......... 345/557; 345/559; 345/606; 345/426
(58) Field of Classification Search .................. 345/557, 345/559, 606, 426
See application file for complete search history.

(56) References Cited

U.S. PATENT DOCUMENTS

| | | | |
|---|---|---|---|
| 5,831,640 A | 11/1998 | Wang et al. | |
| 6,570,573 B1 * | 5/2003 | Kazachinsky et al. | 345/558 |
| 6,633,299 B1 * | 10/2003 | Sreenivas et al. | 345/557 |
| 6,717,577 B1 * | 4/2004 | Cheng et al. | 345/419 |
| 6,897,871 B1 | 5/2005 | Morein et al. | |
| 6,972,769 B1 * | 12/2005 | Nebeker et al. | 345/552 |
| 2007/0040844 A1 * | 2/2007 | Junkins | 345/582 |
| 2008/0001956 A1 * | 1/2008 | Markovic et al. | 345/522 |

OTHER PUBLICATIONS

A Single (Unified) Shader GPU Microarchitecture for Embedded Systems. Victor Moya, Carlos González, Jordi Roca, Agustin Fernández and Roger Espasa. 2005 International Conference on High Performance Embedded Architectures & Compilers (HiPEAC 2005), Nov. 2005.*
Chou et al., "Efficient transmission of triangle meshes to graphic processors", Signal Porocessing Systems, 2000. SIPS 2000. 2000 IEEE Workshop on Oct. 11-13, 2000, Piscataway, NJ, USA, IEEE, Oct. 11, 2000, pp. 275-284 XP010525237.
International Search Report—PCT/US07/079784—International Search Authority—European Patent Office, Feb. 5, 2008.

* cited by examiner

*Primary Examiner* — Xiao M Wu
*Assistant Examiner* — Scott E Sonners

(57) ABSTRACT

Techniques are described for processing computerized images with a graphics processing unit (GPU) using a unified vertex cache and shader register file. The techniques include creating a shared shader coupled to the GPU pipeline and a unified vertex cache and shader register file coupled to the shared shader to substantially eliminate data movement within the GPU pipeline. The GPU pipeline sends image geometry information based on an image geometry for an image to the shared shader. The shared shader performs vertex shading to generate vertex coordinates and attributes of vertices in the image. The shared shader then stores the vertex attributes in the unified vertex cache and shader register file, and sends only the vertex coordinates of the vertices back to the GPU pipeline. The GPU pipeline processes the image based on the vertex coordinates, and the shared shader processes the image based on the vertex attributes.

64 Claims, 9 Drawing Sheets

GRAPHICS PROCESSING UNIT WITH UNIFIED VERTEX CACHE AND SHADER REGISTER FILE

TECHNICAL FIELD

This disclosure relates to graphics processing units and, more particularly, processing computerized images with graphics processing units.

BACKGROUND

A graphics processing unit (GPU) is a dedicated graphics rendering device utilized to manipulate and display computerized graphics on a display device. GPUs are built with a highly-parallel structure that provides more efficient processing than typical, general-purpose central processing units (CPUs) for a range of complex algorithms. For example, the complex algorithms may correspond to representations of three-dimensional computerized graphics. A GPU may implement a number of primitive graphics operations, such as forming points, lines, and triangles, to create complex, three-dimensional images on a display device more quickly than drawing the images directly to the display device with a CPU.

Vertex shading and fragment (pixel) shading are often utilized in the video gaming industry to determine final surface properties of a computerized image, such as light absorption and diffusion, texture mapping, light relation and refraction, shadowing, surface displacement, and post-processing effects. GPUs include at least three major pipeline stages in a typical shader based graphics core: a vertex shader stage, a primitive setup and interpolation stage, and a fragment shader stage. The vertex shader and the fragment shader each maintain dedicated register file space. The shaders typically comprise Single Instruction, Multiple Data (SIMD) processors that receive inputs one by one as threads. A thread may be a group of vertices, primitives, or pixels. The shaders execute multiple threads in an interleaved manner to compensate latency.

A vertex shader is applied to an image geometry for an image and generates vertex coordinates and attributes of vertices within the image geometry. Vertex attributes include, for example, color, normal, and texture coordinates associated with a vertex. A primitive setup and rejection module will form primitives, such as points, lines, or triangles, and reject invisible primitives based on the vertices within the image geometry. An attribute setup module computes gradients of attributes within the primitives for the image geometry. Once the attribute gradient values are computed, primitives for the image geometry may be converted into pixels, and hidden primitive and pixel rejection may be performed. An attribute interpolator then interpolates the attributes over pixels within the primitives for the image geometry based on the attribute gradient values, and sends the interpolated attribute values to the fragment shader for pixel rendering. Results of the fragment shader will be output to a post-processing block and a frame buffer for presentation of the processed image on the display device.

Attributes of vertices within the image geometry are passed through each processing stage along the GPU pipeline. Therefore, the GPU pipeline must move a large amount of data and requires a wide internal data bus to meet the data throughput. Moving the large amount of data through each of the processing stages in the GPU pipeline may create a bottleneck for primitives that include large numbers of attributes. Additionally, attribute gradient setup is computationally intensive and may slow down image processing within the GPU pipeline.

SUMMARY

In general, the disclosure relates to techniques for processing computerized images with a Graphics Processing Unit (GPU) using a unified vertex cache and shader register file. The techniques include creating a shared shader coupled to the GPU pipeline and a unified vertex cache and shader register file coupled to the shared shader to substantially eliminate data movement within the GPU pipeline. A GPU includes at least three major pipeline stages: a vertex shader stage, a primitive setup and interpolation stage, and a fragment shader stage. The shared shader combines shader cores for a vertex shader and a fragment shader. In some cases, the shared shader may also combine shader cores for an attribute gradient setup module and an attribute interpolator. The unified vertex cache and shader register file stores attributes for vertices within an image geometry for an image and acts as a unified register file for the shared shader.

According to the techniques described herein, when the GPU receives an image geometry for an image, the GPU pipeline sends image geometry information that includes vertex threads to the shared shader. The shared shader performs vertex shading to generate vertex coordinates and attributes of vertices in the image geometry. The shared shader then stores the vertex attributes and the vertex threads in the unified vertex cache and shader register file. The shared shader sends the vertex coordinates of the vertices in the image geometry back to the GPU pipeline. The GPU pipeline processes the image by performing primitive setup and rejection based on the vertex coordinates. The GPU pipeline then sends primitive threads for the image geometry to the shared shader to prompt the shared shader to process the image by performing attribute gradient setup based on the vertex attributes. The shared shader stores the primitive threads for the image geometry in the unified vertex cache and shader register file. The shared shader retrieves the vertex attributes from the unified vertex cache and shader register file to perform attribute gradient setup.

The GPU pipeline also sends pixel threads for the image geometry to the shared shader to prompt the shared shader to process the image by performing attribute interpolation and pixel rendering based on the vertex attributes. The shared shader stores the pixel threads for the image geometry in the unified vertex cache and shader register file, and performs attribute interpolation. The shared shader then performs fragment shading to render pixels within the primitives for the image geometry and sends the processed pixel information to a post-processor for presentation of the image on a display device. Therefore, the vertex attributes are never introduced to the GPU pipeline. In this way, the GPU pipeline only moves the primitives for the image geometry and the vertex coordinates that identify each of the vertices within the primitives. In addition, the techniques may reduce the size, i.e., chip area, of the GPU by combining multiple shader cores into the shared shader and combining the individual shader register files and vertex caches into the unified vertex cache and shader register file.

In one embodiment, the disclosure provides a method comprising receiving image geometry information based on an image geometry for an image within a shared shader coupled to a GPU pipeline included in a GPU, storing attributes for vertices in the image geometry in a unified vertex cache and shader register file coupled to the shared shader via a virtual address map, and sending vertex coordinates that identify the vertices in the image geometry to the GPU pipeline. The method further comprise processing the image within the GPU pipeline based on the vertex coordinates, and processing the image within the shared shader based on the attributes of the vertices within the image geometry stored in the unified vertex cache and shader register file.

In another embodiment, the disclosure provides a computer-readable medium comprising instructions that cause a programmable processor to receive image geometry information based on an image geometry for an image within a shared shader coupled to a GPU pipeline included in a GPU, store attributes for vertices in the image geometry in a unified vertex cache and shader register file coupled to the shared shader via a virtual address map, and send vertex coordinates that identify the vertices in the image geometry to the GPU pipeline. The instructions further cause the programmable processor to process the image within the GPU pipeline based on the vertex coordinates, and process the image within the shared shader based on the attributes of the vertices within the image geometry stored in the unified vertex cache and shader register file.

In another embodiment, the disclosure provides a device comprising a GPU pipeline that receives an image geometry for an image, a shared shader coupled to the GPU pipeline that receives image geometry information based on the image geometry, and sends vertex coordinates that identify vertices in the image geometry to the GPU pipeline, and a unified vertex cache and shader register file coupled to the shared shader that stores attributes for each of the vertices in the image geometry via a virtual address map. The GPU pipeline processes the image based on the vertex coordinates, and the shared shader processes the image based on the attributes of the vertices within the image geometry stored in the unified vertex cache and shader register file.

In a further embodiment, the disclosure proves a device comprising first processing means for receiving an image geometry for an image, and a second processing means for receiving image geometry information based on the image geometry, and sending vertex coordinates that identify vertices in the image geometry to the first processing means. The device also comprises storage means for storing attributes for each of the vertices within the image geometry via a virtual address map. The first processing means processes the image based on the vertex coordinates, and the second processing means processes the image based on the attributes of the vertices within the image geometry stored in the storage means.

The techniques described herein may be implemented in hardware, software, firmware, or any combination thereof. If implemented in software, the techniques may be realized in whole or in part by a computer-readable medium comprising instructions that, when executed by a processor, performs one or more of the methods described herein.

The details of one or more embodiments are set forth in the accompanying drawings and the description below. Other features, objects, and advantages of the invention will be apparent from the description and drawings, and from the claims.

DETAILED DESCRIPTION

Figure 1:
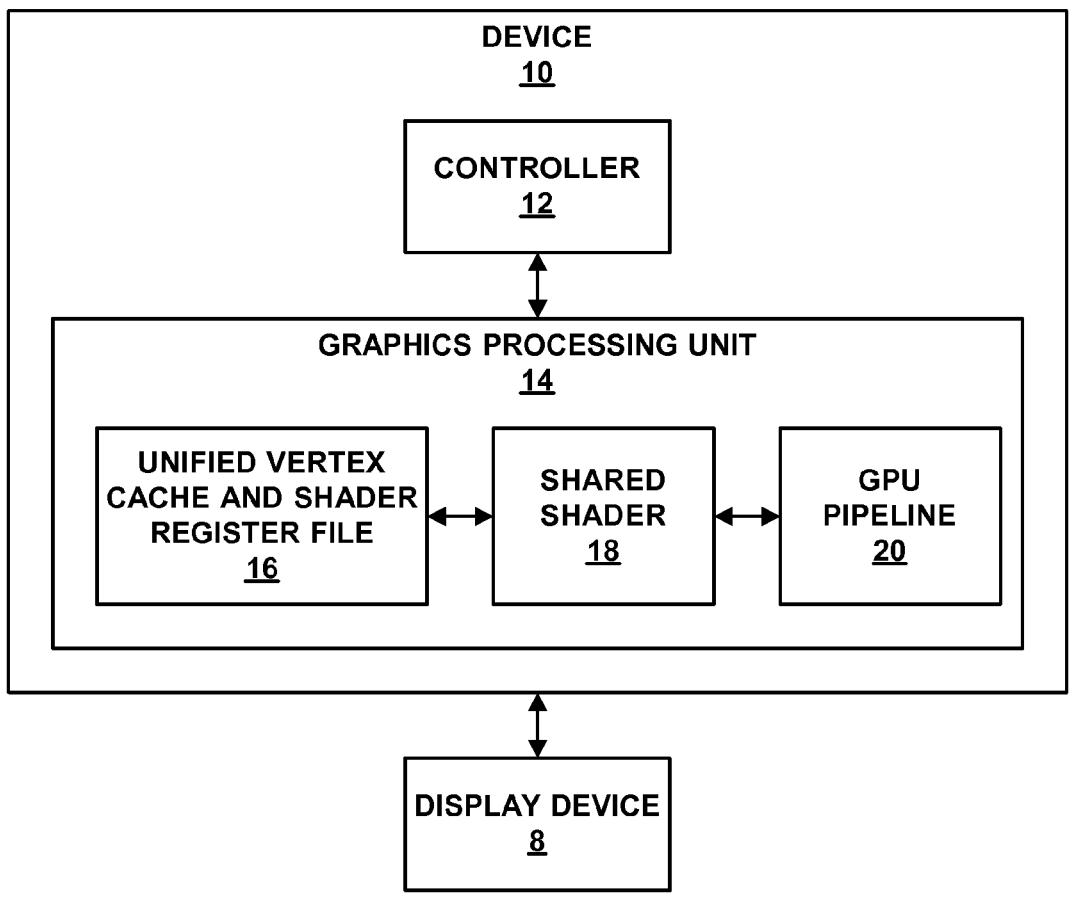
FIG. 1 is a block diagram illustrating an exemplary device including a graphics processing unit (GPU) that implements techniques for processing computerized images using a unified vertex cache and shader register file.

FIG. 1 is a block diagram illustrating an exemplary device 10 including a graphics processing unit (GPU) 14 that implements techniques for processing computerized images using a unified vertex cache and shader register file. In the example of FIG. 1, device 10 includes a controller 12 capable of controlling operation of GPU 14. Controller 12 may also be capable of controlling operation of device 10. In accordance with the techniques described herein, GPU 14 includes a GPU pipeline 20, a shared shader 18 coupled to GPU pipeline 20, and a unified vertex cache and shader register file 16 coupled to shared shader 18. Incorporation of shared shader 18 and unified vertex cache and shader register file 16 may substantially eliminate data movement within GPU pipeline 18. In addition, combining multiple shader cores into shared shader 18 and combining individual shader register files and vertex caches into unified vertex cache and shader register file 16 may reduce the area of GPU 14 within device 10, i.e., in terms of chip area. Unified vertex cache and shader register file 16 may include multiple banks to resolve read and write port conflicts.

GPU 14 receives an image geometry for an image from controller 12 within device 10. The image geometry may correspond to representations of complex, two-dimensional or three-dimensional computerized graphics. GPU 14 processes the image geometry to present image effects, background images, or video gaming images, for example, to a user of device 10 via a display device 8. The images may be formed as video frames in a sequence of video frames. Display device 8 may comprise a liquid crystal display (LCD), a cathode ray tube (CRT) display, a plasma display, or another type of display device integrated with or coupled to device 10.

In some cases, controller 12 may receive the image geometry from applications operating within device 10. For example, device 10 may comprise a computing device operating a video gaming application based on image geometry received from an internal hard drive or a removable data storage device. In other cases, controller 12 may receive the image geometry from applications operating external to device 10. For example, device 10 may comprise a computing device operating a video gaming application based on image geometry received from an external server via a wired or wireless network, such as the Internet. The image geometry may be received via streaming media or broadcast media, which may be wired, wireless or a combination of both.

When a user of device 10 triggers an image effect, selects a background image, or initiates a video game, controller 12 receives the corresponding image geometry from an application and sends the image geometry to GPU 14. GPU 14 processes the image geometry and prepares the image for presentation on display device 8. For example, GPU 14 may implement a number of primitive graphics operations, such as forming lines and triangles, to create a three-dimensional image represented by the received image geometry on display device 8. GPU pipeline 20 within GPU 14 includes at least three major pipeline stages: a vertex shader stage, a primitive setup and interpolation stage, and a fragment shader stage. According to the techniques described herein, shared shader 18 combines shader cores for a vertex shader and a fragment shader. In some cases, shared shader 18 may also combine shader cores for an attribute gradient setup module and an attribute interpolator.

When GPU 14 receives an image geometry for an image from controller 12, GPU pipeline 20 sends image geometry information based on the image geometry to shared shader 18. Shared shader 18 performs vertex shading to generate vertex coordinates and attributes of vertices within the computerized image. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The attributes, for example, may include color, normal, and texture coordinates associated with a vertex. Shared shader 18 then stores the vertex attributes in unified vertex cache and shader register file 16. Unified vertex cache and shader register file 16 stores attributes for the vertices within the image geometry and acts as a unified register file for shared shader 18. Shared shader 18 sends only the vertex coordinates of the vertices within the image geometry back to GPU pipeline 20. In this manner, GPU pipeline 20 is not clogged with the transfer of the attributes between stages, and can support increased throughput.

The primitive setup and interpolation stage in GPU pipeline 20 includes several sub-stages that each performs using either the vertex coordinates or the vertex attributes. For example, GPU pipeline 20 processes the image by performing primitive setup and primitive rejection based on the vertex coordinates to form primitives and discard a subset of the primitives that are unnecessary for the image. Primitives are the simplest types of geometric figures, including points, lines, triangles, and other polygons, and may be formed with one or more vertices within the image geometry. Primitives or portions of primitives may be rejected from consideration during processing of a specific frame of the image when the primitives or the portions of primitives are located on a backside of an object within the image frame, are hidden behind another object within the image frame, or are transparent within the image frame.

As another example, GPU pipeline 20 sends primitive threads to shared shader 18, which prompts shared shader 18 to process the image by performing attribute gradient setup based on the vertex attributes. The primitive threads may indicate primitives for the image geometry. Shared shader 18 stores the primitive threads for the image geometry in unified vertex cache and shader register file 16. Shared shader 18 retrieves the vertex attributes associated with the primitives for the image geometry from unified vertex cache and shader register file 16 to perform attribute gradient setup. GPU pipeline 20 also sends pixel threads to shared shader 18, which prompts shared shader 18 to process the image by performing attribute interpolation and pixel rendering based on attribute gradient values. The pixel thread information may indicate pixels within the primitives for the image geometry. Shared shader 18 stores the pixel threads for the image geometry in the unified vertex cache and shader register file 16, and performs attribute interpolation. Shared shader 18 also performs fragment shading to render pixels within the primitives for the image geometry and sends the processed pixel information to a post-processor for presentation of the image on display device 8. Therefore, the vertex attributes are never introduced to GPU pipeline 18.

Combining the shader cores in shared shader 18 and storing the attributes for vertices within the image geometry in unified vertex cache and shader register file 16 enables GPU pipeline 18 to only move the primitives for the image geometry and the vertex coordinates that identify each of the vertices within the primitives. Removing the large amount of attribute data from GPU pipeline 20 may substantially eliminate bottlenecks in GPU pipeline 20 for primitives that include large numbers of attributes. In addition, combining the shader core for attribute gradient setup in shared shader 18 may improve image processing speed within GPU 14 by performing the attribute gradient setup with shared shader 18. GPU pipeline 20 defers sending the primitive threads to prompt shared shader 18 to perform the computationally intensive setup of attribute gradients to just before attribute interpolation in GPU pipeline 20. Deferring the attribute gradient setup within shared shader 18 until after rejection of the subset of the primitives that are unnecessary for the image within GPU pipeline 20 may substantially reduce computations and power consumption as the attribute gradient setup will only be performed on a subset of the primitives that are necessary for the image.

In the embodiment illustrated in FIG. 1, display device 8 comprises a separate device from device 10. Display device 8 may be coupled to device 10 either wirelessly or with a wired connection. For example, device 10 may comprise a server or other computing device of a wireless communication service provider, and display device 8 may be included within a wireless communication device. In this case, as examples, display device 8 may comprise a display within a mobile radiotelephone, a satellite radiotelephone, a portable computer with a wireless communication card, a personal digital assistant (PDA) equipped with wireless communication capabilities, or any of a variety of devices capable of wireless communication. As another example, device 10 may comprise a server or other computing device connected to display device 8 via a wired network, and display device 8 may be included within a wired communication device or a device not principally directed to communication.

In other embodiments, display device 8 may be integrated within device 10. For example, device 10 may comprise a wireless communication device and display device 8 may comprise a display within the wireless communication device. As another example, device 10 may comprise a desktop or notebook computer, and display device 8 may comprise a dedicated monitor or display of the computer. Device 10 may also comprise a wired communication device or a device not principally directed to communication, and display device 8 may comprise a display within the device. For example, device 10 may comprise a PDA or handheld video game device that includes display device 8. Hence, in various embodiments, video imagery may be obtained from a remote device or from a local device, each of which may be a video server that generates video or video objects, or a video archive that retrieves stored video or video objects.

Figure 2:
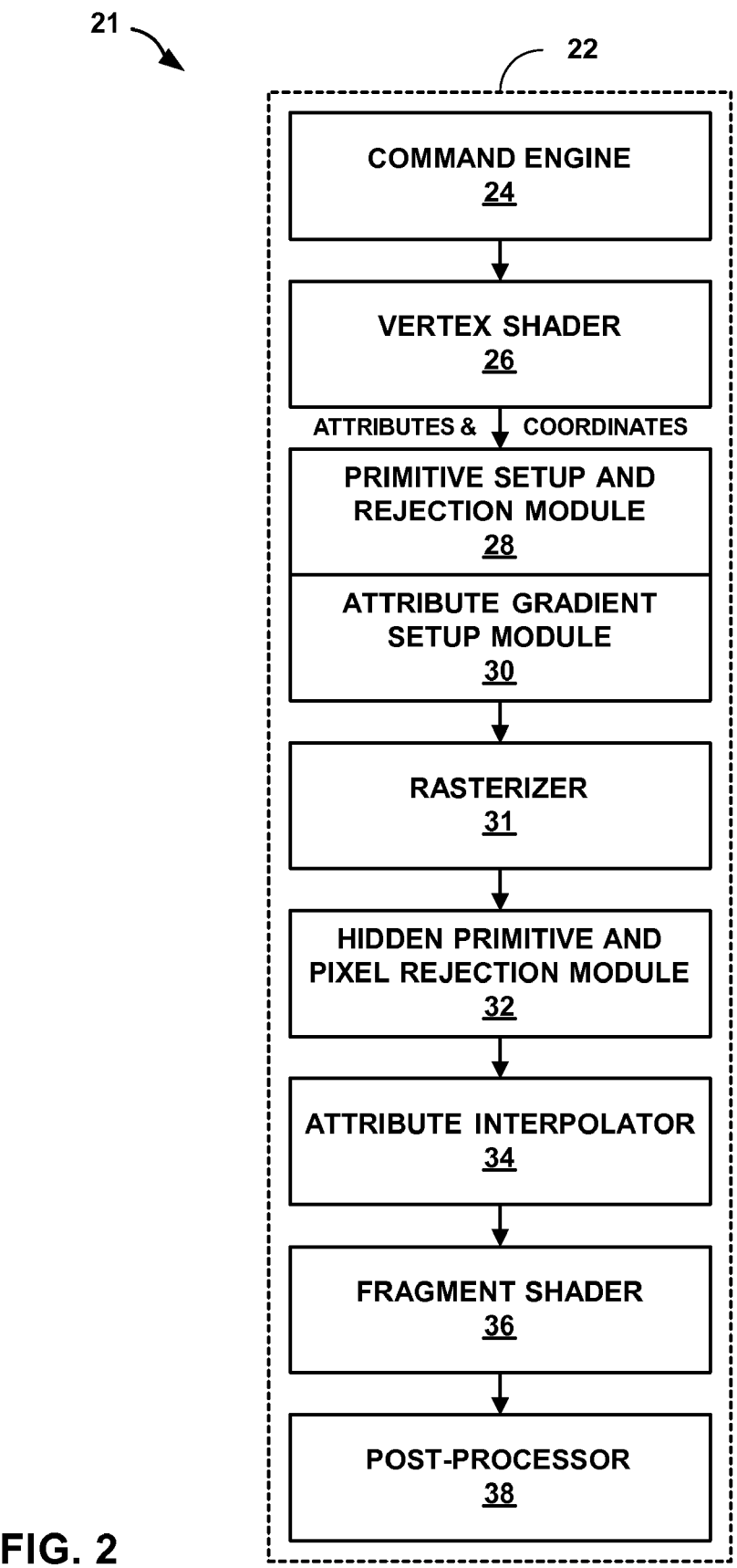
FIG. 2 is a block diagram illustrating a GPU pipeline within a conventional GPU.

FIG. 2 is a block diagram illustrating a GPU pipeline 22 within a conventional GPU 21. Conventional GPU 21 may be included within a device substantially similar to device 10 from FIG. 1. GPU pipeline 22 includes a command engine 24, a vertex shader 26, a primitive setup and rejection module 28, an attribute gradient setup module 30, a rasterizer 31, a hidden primitive and pixel rejection module 32, an attribute interpolator 34, a fragment shader 36, and a post-processor 38. Command engine 24 receives image geometry and rendering commands from a controller of the device in which conventional GPU 21 resides. The image geometry may correspond to representations of complex, two-dimensional or three-dimensional computerized graphics. Command engine 24 passes the image geometry and rendering commands along GPU pipeline 22 to the other processing stages.

GPU pipeline 22 includes at least three major pipeline stages: a vertex shader stage, a primitive setup and interpolation stage, and a fragment shader stage. Vertex shader 26 is applied to the image geometry and determines surface properties of the computerized image at vertices within the image geometry. In this way, vertex shader 26 generates vertex coordinates and attributes of each of the vertices within the image geometry. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The vertex attributes, for example, may include color, normal, and texture coordinates associated with a vertex. Vertex shader 26 within conventional GPU 21 may also include an integrated vertex cache.

The primitive setup and interpolation stage in GPU pipeline 26 includes sub-stages, primitive setup and rejection module 28, attribute gradient setup module 30, rasterizer 31, hidden primitive and pixel rejection module 32, and attribute interpolator 34, that each use either the vertex coordinates or the vertex attributes to process the computerized image. In order for the other processing stages in GPU pipeline 22 to receive the necessary inputs, the vertex coordinates and the vertex attributes of all of the vertices within the image geometry are passed along GPU pipeline 22. Therefore, GPU pipeline 22 must move a large amount of data, which requires conventional GPU 21 to include a wide internal data bus to meet the data throughput. In addition, First In, First Out (FIFO) buffers or other types of buffers are included between each of the processing stages in GPU pipeline 22 to balance the pipeline stages by storing the vertex attributes.

Primitive setup and rejection module 28 forms primitives with one or more vertices within the image geometry. Primitives are the simplest types of geometric figures and may include points, lines, triangles, and other polygons. Primitive setup and rejection module 28 may also reject primitives by performing scissoring and backface culling using the XY coordinates of the vertices within the primitives. Scissoring and backface culling reject primitives and portions of primitives from consideration during processing of a specific frame of the image when the primitives and the portions of primitives are invisible within the image frame. For example, the primitives and the portions of primitives may be located on a backside of an object within the image frame. Primitive setup and rejection module 28 may disregard attribute gradients of vertices associated with rejected primitives within the image geometry. Moving the vertex attributes through each of the processing stages in GPU pipeline 22 may create a bottleneck for primitives that include large numbers of attributes.

Attribute gradient setup module 30 computes gradients of attributes associated with the primitives for the image geometry. An attribute gradient comprises a difference between the attribute value at a first pixel and the attribute value at a second pixel within a primitive moving in either a horizontal (X) direction or a vertical (Y) direction. Attribute gradient setup module 30 utilizes the vertex attributes to compute the attribute gradients. The attribute gradient setup processing step is computationally intensive and may slow down image processing within GPU pipeline 22. The attribute gradient setup rate heavily depends on the number of vertex attributes associated with the primitives regardless of the number of pixels included in the primitives.

Once the attribute gradient values are computed, rasterizer 31 converts primitives of the image geometry into pixels based on the XY coordinates of each of the vertices within the primitives and the number of pixels included in the primitives. Hidden primitive and pixel rejection module 32 rejects hidden primitives and hidden pixels within the primitives using the early depth and stencil test based on the Z coordinate of the vertices within the primitives. Primitives or pixels within primitives may be considered hidden, and be rejected from consideration during processing of a specific frame of the image, when the primitives or the pixels within primitives are located behind another object within the image frame or are transparent within the image frame.

Attribute interpolator 34 interpolates the attributes over pixels within the primitives based on the attribute gradient values. Attribute interpolator 34 may disregard attribute gradients of vertices associated with rejected primitives within the image geometry. The interpolated attribute values are then input to fragment shader 36 to perform pixel rendering of the primitives. Fragment shader 36 determines surface properties of the image at pixels within the primitives for the image geometry, and renders pixels of the primitives. Results of fragment shader 36 will be output to post-processor 38 for presentation of the processed computerized image on a display device.

Figure 3:
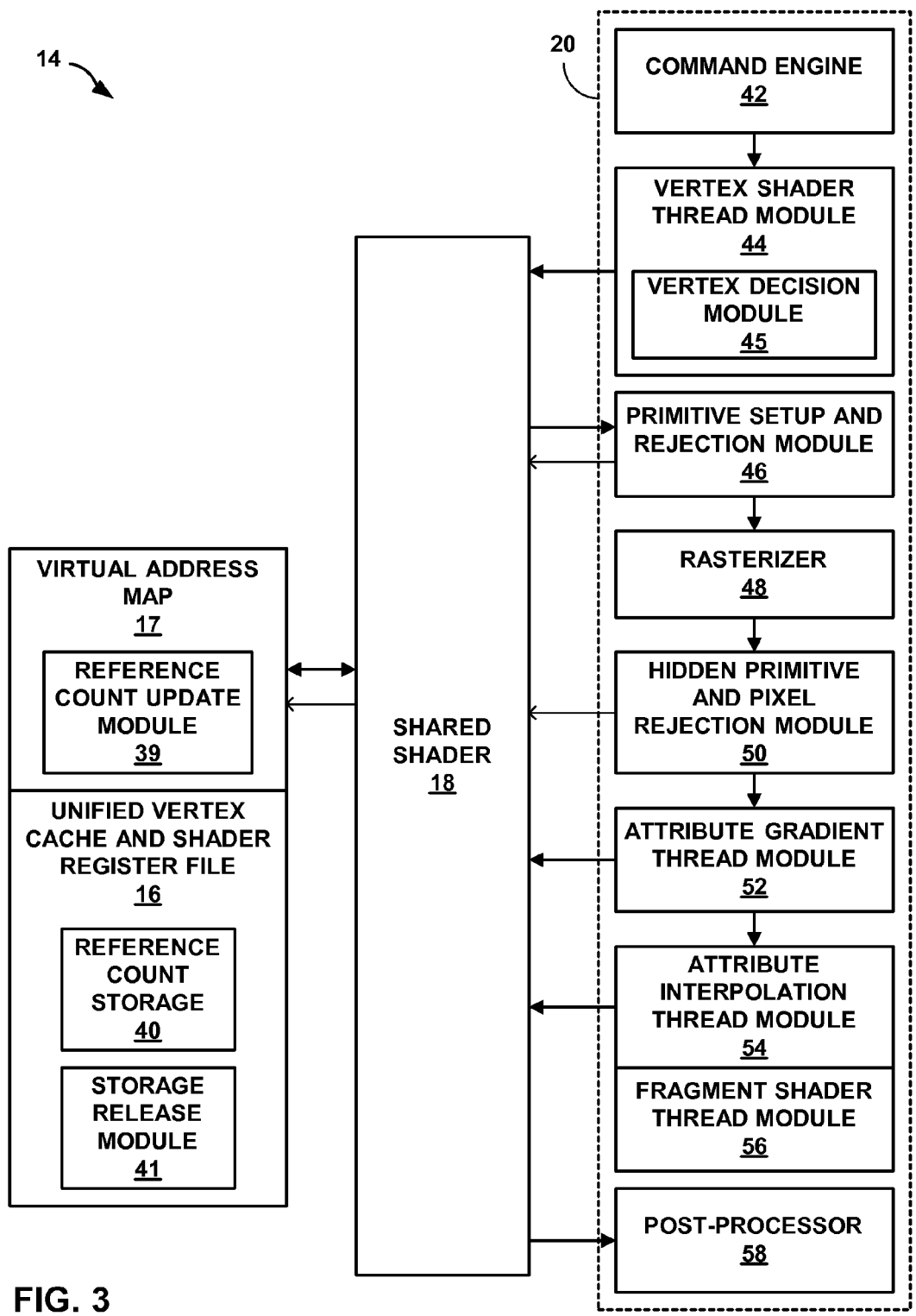
FIG. 3 is a block diagram illustrating the GPU from FIG. 1 including a GPU pipeline, a shared shader coupled to the GPU pipeline, and a unified vertex cache and shader register file coupled to the shared shader.

FIG. 3 is a block diagram illustrating GPU 14 from FIG. 1 including GPU pipeline 20, shared shader 18 coupled to GPU pipeline 20, and unified vertex cache and shader register file 16 coupled to shared shader 18. In addition, GPU 14 includes a virtual address map 17 that maps vertex cache locations and virtual register addresses to physical addresses within unified storage 16. Unified vertex cache and shader register file 16 includes reference count storage 40 and a storage release module 41. Virtual address map 17 includes a reference count update module 39.

Reference count storage 40 stores the reference counts for each of the vertices within the image geometry. Virtual address map 17 manages release and allocation of storage space for attributes or threads within unified vertex cache and shader register file 16 via storage release module 41. A thread may be a group of vertices, primitives, or pixels. Reference count update module 39 within virtual address map 17 manages updating of reference counts within reference count storage 40.

Utilizing shared shader 18 and unified vertex cache and shader register file 16 within GPU 14 may substantially eliminate data movement within GPU pipeline 20. In addition, combining multiple shader cores into shared shader 18 and combining the individual shader register files and vertex caches into unified vertex cache and shader register file 16 may reduce the area of GPU 14 within device 10. Unified vertex cache and shader register file 16 may include multi-banks to resolve read and write port conflicts.

GPU pipeline 20 includes a command engine 42, vertex shader thread module 44 including a vertex decision module 45, a primitive setup and rejection module 46, a rasterizer 48, a hidden primitive and pixel rejection module 50, an attribute gradient thread module 52, an attribute interpolation thread module 54, fragment shader thread module 56, and a post-processor 58. Command engine 42 receives image geometry and rendering commands from controller 12 of device 10. The image geometry may correspond to representations of complex two-dimensional or three-dimensional computerized graphics. Command engine 42 passes the image geometry and rendering commands to the other processing stages via GPU pipeline 20.

GPU pipeline 20 within GPU 14 includes at least three major pipeline stages: a vertex shader stage, a primitive setup and interpolation stage, and a fragment shader stage. Shared shader 18 combines shader cores for a vertex shader and a fragment shader. In the example illustrated in FIG. 3, shared shader 18 also combines shader cores for an attribute gradient setup module and an attribute interpolator. In other embodiments, attribute gradient setup module and an attribute interpolator may be included in GPU pipeline 20.

Command engine 42 sends vertex indices for vertices within the image geometry to vertex decision module 45 within vertex shader thread module 44. The vertex indices for each of the vertices within the image geometry may be generated by controller 12 of device 10 or by command engine 42. Vertex decision module 44 determines whether each of the vertices within the image geometry are included in unified vertex cache and shader register file 16 based on the corresponding vertex indices. Vertices within the image geometry that are not included in unified vertex cache and shader register file 16 are referred to herein as "missed vertices". Vertices within the image geometry that are already included in unified vertex cache and shader register file 16 are referred to herein as "hit vertices"

In the case of missed vertices, vertex shader thread module 44 assigns vertex cache index values to each of the missed vertices that indicate storage locations of vertex coordinates and attributes for the missed vertices in unified vertex cache and shader register file 16. Vertex shader thread module 44 may utilize a virtual vertex cache mechanism to assign the vertex cache index values to the missed vertices within the image geometry.

Vertex decision module 45 then provides the vertex cache index values that indicate storage locations in unified vertex cache and shader register file 16 of the vertex coordinates and attributes for each of the vertices, hit or missed, to reference count update module 39 within virtual address map 17 via shared shader 18. Upon receiving the vertex cache index values for the missed vertices, reference count update module 39 initializes reference counts within reference count storage 40 for each of the missed vertices to zero. Reference count update module 39 then increments the reference counts within reference count storage 40 for all the vertices, hit and missed, within the image geometry by one.

Vertex shader thread module 44 reads information for the missed vertices and forms vertex threads based on the information for the missed vertices within the image geometry. Vertex shader thread module 44 sends the vertex threads to shared shader 18. Shared shader 18 stores the vertex threads in unified vertex cache and shader register file 16, which acts as a unified register file for shared shader 18, via virtual address map 17. Shared shader 18 performs vertex shading to determine surface properties of the image at the missed vertices within the image geometry. In this way, shared shader 18 generates vertex coordinates and attributes of the missed vertices within the image geometry. Shared shader 18 stores the attributes for the missed vertices at the assigned storage locations in unified vertex cache and shader register file 16 via virtual address map 17.

Shared shader 18 then sends only the vertex coordinates of all the vertices, hit and missed, within the image geometry back to primitive setup module 46 within GPU pipeline 20. In this manner, GPU pipeline 20 is not clogged with the transfer of the attributes between stages, and can support increased throughput. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The vertex attributes, for example, may include color, normal, and texture coordinates associated with a vertex.

The primitive setup and interpolation stage in GPU pipeline 20 includes sub-stages, primitive setup and rejection module 46, rasterizer 48, hidden primitive and pixel rejection module 50, attribute gradient thread module 52, and attribute interpolation thread module 54, that each uses either the vertex coordinates or the vertex attributes to process the computerized image. For example, primitive setup and rejection module 46, rasterizer 48, and hidden primitive and pixel rejection module 50 process the image based only on the vertex coordinates. However, attribute gradient thread module 52 and attribute interpolation thread module 54 prompt shared shader 18 to perform attribute gradient setup and attribute interpolation outside of GPU pipeline 20 based on the vertex attributes stored within unified vertex cache and shared register file 16. In this way, the vertex attributes are never introduced to GPU pipeline 20, providing significant gains in efficiency.

Storing the attributes for the vertices within the image geometry in unified vertex cache and shared register file 16 and only utilizing the vertex attributes in shared shader 18, eliminates a large amount of data from passing through GPU pipeline 20, which reduces the width of the internal data bus included in GPU 20. Reducing the amount of data movement may also reduce power consumption within GPU 20. In addition, FIFO buffers or other types of buffers positioned between at least some of the processing stages may be removed from GPU pipeline 20 to reduce the area of GPU 14 within device 10.

Primitive setup and rejection module 46 forms primitives with one or more vertices within the image geometry. Primitives are the simplest types of geometric figures and may include points, lines, triangles, and other polygons. Shared shader 18 receives primitives threads including setup primitive information from primitive setup and rejection module 46. When shared shader 18 receives setup primitive information for a primitive in which each of the vertices are only used once, reference counts within reference count storage 40 for the vertices are not incremented and remain unchanged. When shared shader 18 receives setup primitive information for a primitive in which at least one of the vertices is used more than once, a reference count within reference count storage 40 for the at least one vertex is incremented by one each time the vertex is reused. For example, if the vertex is used twice in the primitive, the reference count for the vertex will be incremented by one.

Primitive setup and rejection module 46 may also reject primitives by performing scissoring and backface culling using the XY coordinates of the vertices within the image geometry. Scissoring and backface culling reject primitives and portions of primitives from consideration during processing of a specific frame of the image when the primitives and the portions of primitives are invisible within the image frame. For example, the primitives and the portions of primitives may be located on a backside of an object within the image frame.

When primitive setup and rejection module 46 rejects a primitive for the image geometry, shared shader 18 receives primitive threads including rejected primitive information from primitive setup and rejection module 46. Shared shader 18 sends a request to storage release module 41 via virtual address map 17 to release storage space in unified vertex cache and shader register 16 for the attributes of the vertices within the rejected primitive. Upon receiving the request, storage release module 41 decrements reference counts within reference count storage 40 for the vertices within the rejected primitive by one. If the reference counts within reference count storage 40 are decremented to zero, storage release module 41 releases the storage space in unified vertex cache and shader register file 16 for the attributes of the vertices within the rejected primitive.

Only moving the primitives for the image geometry and the vertex coordinates associated with the primitives through GPU pipeline 20 substantially eliminates bottlenecks in GPU pipeline 20 for primitives that include large numbers of attributes. Rasterizer 48 converts the primitives of the image geometry into pixels based on the XY coordinates of vertices within the primitives and the number of pixels included in the primitives. Hidden primitive and pixel rejection module 50 rejects hidden primitives and hidden pixels within the primitives using the early depth and stencil test based on the Z coordinates of the vertices within the primitives. If hidden primitive and pixel rejection module 50 rejects all pixels within a primitive, the primitive is automatically rejected. Primitives or pixels within primitives may be considered hidden, and be rejected from consideration during processing of a specific frame of the image, when the primitives or the pixels within primitives are located behind another object within the image frame or are transparent within the image frame.

When hidden primitive and pixel rejection module 50 rejects a primitive for the image geometry, shared shader 18 receives primitive threads including rejected primitive information from hidden primitive and pixel rejection module 50. Shared shader 18 sends a request to storage release module 41 via virtual address map 17 to release storage space in unified vertex cache and shader register file 16 for the attributes of the vertices within the rejected primitive. Upon receiving the request, storage release module 41 decrements reference counts within reference count storage 40 for the vertices within the rejected primitive by one. If the reference counts within reference count storage 40 are decremented to zero, storage release module 41 releases the storage space in unified vertex cache and shader register file 16 for the attributes of the vertices within the rejected primitive.

Typically, a large percentage of primitives are rejected by scissoring and backface culling performed by primitive setup and rejection module 46, and the early depth and stencil test performed by hidden primitive and pixel rejection module 50. Therefore, deferring prompting shared shader 18 to perform the attribute gradient setup until after all the primitive rejection is performed within GPU pipeline 18, eliminates attribute gradient computations for attributes associated with a subset of the primitives that are unnecessary for the image.

Attribute gradient thread module 52 sends primitive thread information to shared shader 18 to prompt shared shader 18 to perform attribute gradient setup. The primitive thread information may indicate primitives for the image geometry. Shared shader 18 stores the primitive threads in unified vertex cache and shader register file 16 via virtual address map 17. Shared shader 18 retrieves the vertex attributes of each of the vertices within primitives for the image geometry from unified vertex cache and shader register file 16 via virtual address map 17. Shared shader 18 computes gradients of attributes associated with the primitives for the image geometry. An attribute gradient comprises a difference between the attribute value at a first pixel and the attribute value at a second pixel within a primitive moving in either a horizontal (X) direction or a vertical (Y) direction.

After shared shader 18 computes gradients of attributes of all vertices within a primitive for the image geometry, shared shader 18 sends a request to storage release module 41 via virtual address map 17 to release storage space in unified vertex cache and shader register file 16 for the attributes of the vertices within the primitive. Upon receiving the request, storage release module 41 decrements reference counts within reference count storage 40 for the vertices within the primitive by one. If the reference counts within reference count storage 40 are decremented to zero, storage release module 41 releases the storage space in unified vertex cache and shader register file 16 for the attributes of the vertices within the primitive.

Shared shader 18 sends a request to virtual address map 17 to allocate storage space in unified vertex cache and shader register file 16 for the primitives resulting from the attribute gradient setup results. Shared shader 18 then provides cache index values that indicate storage locations in unified vertex cache and shader register file 16 of the primitives to reference count update module 39 within virtual address map 17. Upon receiving the cache index values for the primitives, reference count update module 39 initializes reference counts within reference count storage 40 for each of the primitives to zero. Reference count update module 39 then increments the reference counts within reference count storage 40 for each of the primitives by one for each pixel thread generated for the primitive.

Attribute interpolation thread module 54 forms a stream of pixel threads for each of the primitives not rejected by primitive setup and rejection module 46 or hidden primitive and pixel rejection module 50. Once the attribute gradient values are computed, attribute interpolation thread module 54 and fragment shader thread module 56 send the pixel thread information to shared shader 18 to prompt shared shader 18 to perform attribute interpolation and pixel rendering. The pixel thread information may indicate pixels within the primitives for the image geometry. Shared shader 18 stores the pixel threads in unified vertex cache and shader register file 16 via virtual address map 17.

Shared shader 18 interpolates the attributes over the pixels within the primitives based on the attribute gradient values. After shared shader 18 interpolates the attributes over all the pixels within each of the pixel threads of the primitives, shared shader 18 sends a request to storage release module 41 via virtual address map 17 to release storage space in unified vertex cache and shader register file 16 for the primitives. Upon receiving the request, storage release module 41 decrements reference counts within reference count storage 40 for each of the primitives by one for each of the completed pixel threads. If the reference counts within reference count storage 40 are decremented to zero, storage release module 41 releases the storage space in unified vertex cache and shader register file 16 for the primitives.

After completing attribute interpolation for each pixel thread, shared shader 18 sends a request to virtual address map 17 to allocate storage space in unified vertex cache and shader register file 16 for the pixels within the primitives. Shared shader 18 then performs fragment shading to determine surface properties of the computerized image at the pixels within the primitives for the image geometry. In this way, shared shader 18 renders pixels of the primitives based on the interpolated attribute values. After shared shader 18 renders the pixels within the primitives, shared shader 18 sends a request to storage release module 41 via virtual address map 17 to release storage space in unified vertex cache and shader register file 16 for the pixels. Upon receiving the request, storage release module 41 releases the storage space in unified vertex cache and shader register file 16 for the pixels within the primitives. Results of shared shader 18 will be output to a post-processor 58 for presentation of the processed image on display device 8.

Combining the shader core for the computationally intensive attribute gradient setup module into shared shader 18 may improve image processing speed and reduce power consumption within GPU 14. In addition, combing the shader core for the attribute gradient setup module into shared shader 18 eliminates the need for storage buffers between processing stages within GPU pipeline 20 to compensate latency of the rasterizer and primitive rejection processing steps due to large amounts of data.

In some cases, vertex coordinates and attributes of all vertices within the image geometry are determined external to GPU pipeline 20. Therefore, primitives formed with the missed vertices do not need shared shader 18 to calculate attributes of the missed vertices. In this case, unified vertex cache and shader register file 16 may operate as a vertex buffer. Command engine 42 may assign vertex index values that identify storage location for the attributes within the vertex buffer and send the predetermined vertex coordinates and attributes of each of the vertices within the image geometry to the vertex buffer.

Figure 4:
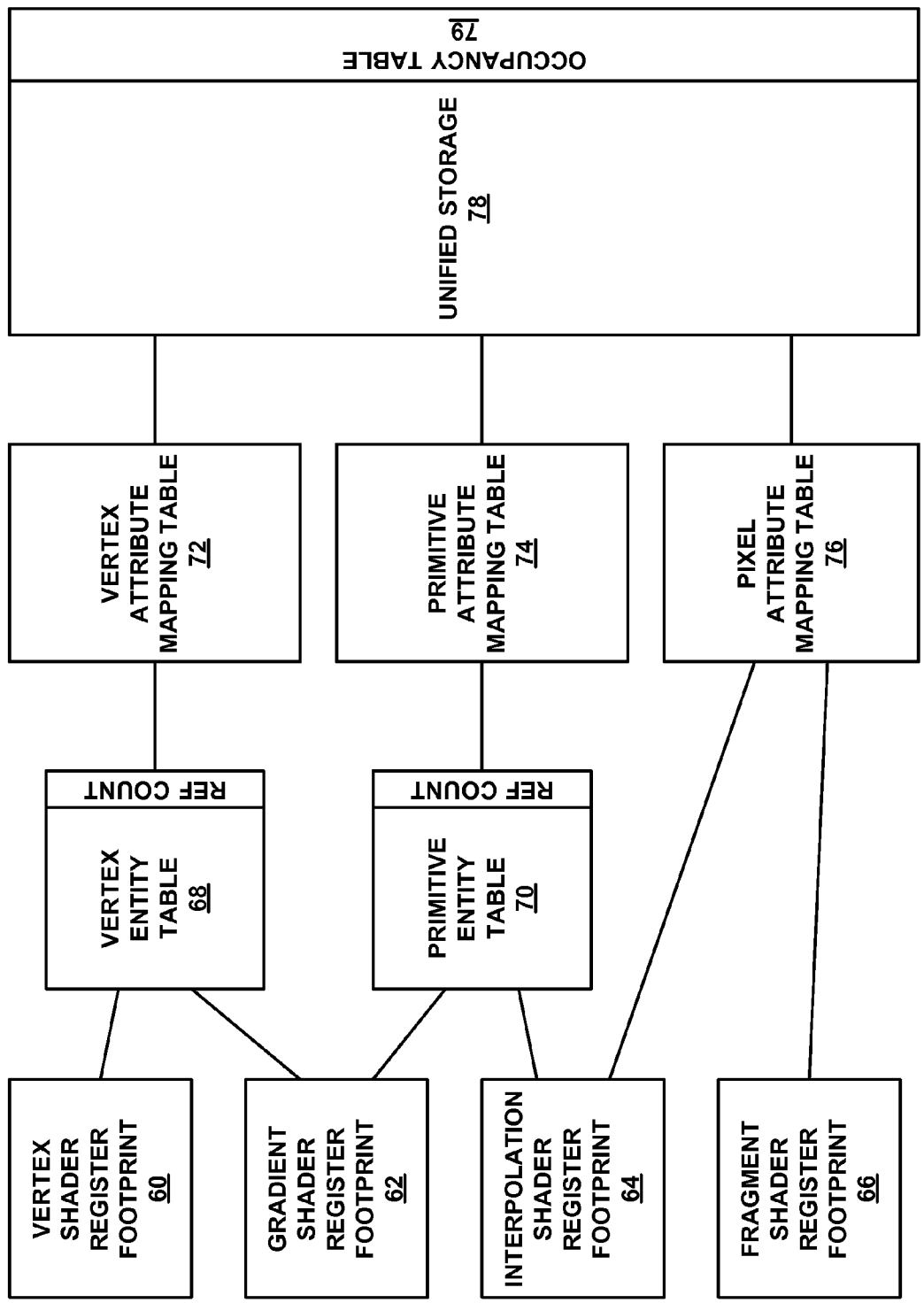
FIG. 4 is a block diagram illustrating exemplary mapping table relationships within a virtual address map associated with a unified vertex cache and shader register file.

FIG. 4 is a block diagram illustrating exemplary mapping table relationships within a virtual address map associated with a unified vertex cache and shader register file. For purposes of explanation, it will be assumed herein that the mapping table relationships illustrated in FIG. 4 are maintained within virtual address map 17 associated with unified vertex cache and shader register file 16 within GPU 14 from FIGS. 1 and 3. In other embodiments, virtual address map 17 may map vertex cache locations and virtual register addresses to physical addresses within unified vertex cache and shader register file 16, and handle release and allocation of storage space for vertex attributes or threads within unified vertex cache and shader register file 16 according to another address mapping scheme.

Virtual address map 17 enables different threads and attributes utilized by different processing steps within shared shader 18 to coexist and be stored in unified vertex cache and shader register file 16. In this way, all the storage space within unified vertex cache and shader register file 16 is uniform and may be reused to reduce an area of GPU 14 within device 10 and to reduce power consumption within GPU 14.

The mapping table relationship illustrated in FIG. 4 includes a vertex shader register footprint 60 and a gradient shader register footprint 62 coupled to vertex entity table 68 that maintains a reference count. Vertex entity table 68 is coupled to unified storage 78 via vertex attribute mapping table 72. In the embodiment described herein, unified storage 78 corresponds to unified vertex cache and shader register file 16. In addition, an occupancy table 79 is associated with unified storage 78. The mapping table relationship also includes an interpolation shader register footprint 64 coupled, along with gradient shader register footprint 62, to primitive entity table 70 that maintains a reference count. Primitive entity table 70 is coupled to unified storage 78 via primitive attribute mapping table 74. Finally, the mapping table relationship includes a fragment shader register footprint 66 coupled, along with interpolation shader register footprint 64, to unified storage 78 via pixel attribute mapping table 76.

The different shader cores combined into shared shader 18 may have different characteristics for unified storage 78. For the vertex and fragment shader cores combined into shared shader 18, since the operation comprises one input to shared shader 18 and one output from shared shader 18, input register files, temporary register files and output register files may be unified. A software driver or shader compiler for the vertex and fragment shader cores specifies a maximum register file footprint for all three types of register files. For example, a vertex shader core may have a maximum register file footprint equal to sixteen four-dimensional vectors. Ten of the four-dimensional vectors may be used as input registers at beginning of the shader life cycle, and eight of the four-dimensional vectors may be used as output registers at end of the shader life cycle.

However, some input registers may already be stored in unified storage 78 as from a previous shader stage, and the result of the previous shader stage may also be stored in unified storage 78. A thread associated with the current shader stage will need a flag to specify register usage for unified storage 78 of the maximum register file footprint. For example, a flag 00 for a thread may indicate that the input register is stored for the thread as a result of a previous shader stage, a flag 01 for a thread may indicate that a new input register is loaded with the thread, a flag 10 for a thread may indicate that an output register is stored for the thread, and a flag 11 for a thread may indicate that the output register is read to the next shader stage. A thread associated with the current shader stage may need another flag to specify that a register will be released immediately after thread completion. For example, a flag 0 for the thread may indicate that the register will be maintain within unified storage 78, and a flag 1 for the thread may indicate that the register will be released from unified storage 78.

As an example, for a vertex thread associated with the vertex shader stage of shared shader 18, all image geometry information will be specified as new input with flag 01 because there are no previous shader stages within shared shader 18. Only the vertex coordinates will be marked as output with flag 11, and the vertex attributes will be marked for storage as an output register in unified storage 78 with flag 10. All the registers, except those marked with flag 10, may be set for release after thread completion. As another example, for a pixel thread associated with the fragment shader stage of shared shader 18, a majority of the inputs are results of attribute interpolation within shared shader 18 and are marked as previous input with flag 00. All of the results of the fragment shader stage within shared shader 18 may be marked as output for the next shader stage with flag 11. In this case, all of the registers may be set for release after thread completion.

Some difficulties may occur during the attribute gradient setup and attribute interpolation shader stages within shared shader 18 if the vertex attributes stored in unified storage 78 are used directly. Since a vertex attribute in unified storage 78 may be hit and referenced by multiple primitives for the image geometry, release of the vertex attributes is usually controlled via a simple mechanism, such as a reference count. A vertex attribute first generated and stored by shared shader 18 has a reference count set to 1. Each time the vertex attribute hits in unified storage 78, the reference count is increased by one.

When primitive setup and rejection module 46 within GPU pipeline 20 generates a triangle list, every vertex within the triangle list will be used once and their reference counts will not be adjusted. However, when primitive setup and rejection module 46 generates primitives from a triangle strip, a triangle fan, or a line strip, most of the inner vertices within the primitives will be re-used multiple times, and their reference counts will be increased accordingly. According to assembly rule, if a vertex is first used in primitive setup and rejection module 46, its reference count will not be adjusted. After that, every time the vertex is re-used, its reference count is increased by one. Therefore, in the case of a triangle strip, the reference count for each of the inner vertices within the triangle strip will be increased by two. In the case of a triangle fan, the reference count for the first vertex for the triangle fan will be increased by (N−1), where N is the total number of triangles in the fan, and the reference count for each of the inner vertices within the triangle fan will be increased by one. The reference count for the inner vertices within a line strip will be increased by one.

After setup for the primitive is complete, the reference count for every vertices within the primitive will be decreased by one. If the reference count for a vertex is counted down to zero, the attributes of the vertex stored in unified storage 78 can be released. Therefore, when generating vertex coordinates and attributes, shared shader 18 cannot mark the vertex attributes stored in unified storage 78 for release. The vertex attributes are released from unified storage 78 based on the reference count.

The attribute gradient setup shader stage within shared shader 18 usually will have the same number of output registers as input registers since the operation comprises one primitive input to shared shader 18 and one primitive output from shared shader 18. Due to re-use of vertex attributes during primitive setup, inputs for the attribute interpolator shader stage within shared shader 18 may use additional storage of three values per register for an initial pixel value and two attribute gradients. In some cases, a value of one of the vertices within the primitive may be re-used as the initial pixel value to conserve storage space in unified storage 78.

The attribute interpolator shader stage within shared shader 18 uses the initial value and the two attribute gradients stored in unified storage 78 as inputs, plus a stream of pixel information as additional inputs. The attribute interpolator shader stage generates multiple outputs depending on the number of pixels or pixel quads covered by the primitive. Each pixel will take a certain amount of storage space to store their attributes. Therefore, the stream of pixel information may be split into multiple pixel threads. The pixel threads may be out of order when received by shared shader 18 or when sent out from shared shader 18.

To correctly release the storage space for results of the attribute gradient setup shader stage, a similar reference count mechanism may be used. If a primitive is not rejected by primitive setup and rejection module 46 or hidden primitive and pixel rejection module 50, attribute gradient thread module 54 forms a stream of pixel threads. After shared shader 18 performs the attribute gradient setup shader stage, a new primitive entity and related storage will be allocated in virtual map tables and unified storage 78. The reference counts for the primitives in the primitive entity table will be incremented by one for each pixel thread generated for the primitive. When attribute interpolation is done, the reference count for the primitive is decremented by one. After all pixel threads for attribute interpolation for the primitive are done, the reference count will be decremented to zero. The storage space for the primitive entity and results of the attribute gradient setup shader stage for the primitive will be released from the virtual map tables and unified storage 78.

Every vertex, primitive or pixel within unified storage 78 has a unique identifier (ID). Another parameter may specify the size of the storage space occupied by the vertices, primitives or pixels. For example, a triangle is composed of three vertices. When a primitive thread is scheduled into shared shader 18, the three vertex IDs will be loaded into unified storage 78 along with the other thread information. Inside shared shader 18, the result of the vertex shader stage will be accessed via these IDs behind the shader code. For instance, an instruction FADD temp0, v0[i], v1[j], where v0 means vertex 0 and v1 means vertex 1, behind the shader code, will automatically look up IDs for vertex0 and vertex1 and then direct vertex0 and vertex1 to their physical addresses in unified storage 78 via vertex attribute mapping table 72. The same mechanism may be applied to the other shader stages within shared shader 18.

The description above discusses logical handling of unified storage 78. To efficiently utilize all the storage space, it may be desirable or necessary to include a virtual or logical layer and a physical layer for unified storage 78. The virtual layer handles entities (e.g., register files, vertices, primitives, and pixels), occupancy, allocation, release, and intrinsic relationships between any two neighboring shader stages within shared shader 18. The physical layer handles addressing and accessing of real storage. For example, a vertex logically consists of many attributes allocated continuously, but the vertex may be stored piece by piece in physical storage.

Virtual and physical layer storage is utilized because different entities will need different sizes of storage. For example, a vertex in unified storage 78 may use eight registers, a primitive may use twenty-four registers, and a pixel may use six registers. Furthermore, different shader stages within shared shader 18 may require different temporary or maximum register file footprints. After a thread of a shader is used, some register space will be released within unified storage 78. After all shader stages have executed, data will be cut from unified storage 78 randomly piece by piece. Therefore, it is difficult for unified storage 78 to keep continuity for all entities all the time.

A mapping table for every entity may be used to map a virtual address to a physical address within unified storage 78. Table 1 shown below illustrates an exemplary maximum register footprint table that instructs shared shader 18 how to allocate unified storage 78. Table 1 may comprise any of vertex shader register footprint 60, gradient shader register footprint 62, interpolation shader register footprint 64, and fragment shader register footprint 66.

TABLE 1

| Virtual Register ID | Description | Usage Code | Release Code |
|---|---|---|---|
| Reg(0)-(n − 1) | Vertex0 | 00 | No release |
| Reg(n)-(2n − 1) | Vertex1 | 00 | No release |
| Reg(2n)-(3n − 1) | Vertex2 | 00 | No release |
| Reg(3n)-(m − 1) | Load thread inputs | 01 | Release |
| Reg(m)-(k − 1) | Temporary registers | | Release |
| Reg(k)-(l − 1) | Output registers | 10 | No release |
| Reg(l)-(j) | Output registers | 11 | Release |

Based on the register file footprint shown in Table 1, when a thread is scheduled into shared shader 18, shared shader 18 will allocate enough physical storage for the thread and create a related mapping table for each of the register groups, except for vertex0, vertex1, and vertex2 because they are already stored in unified storage 78. Actual input, temporary, and output registers with flag 11 can be mixed and treated as temporary registers. Output registers with flag 10 may be used as input or temporary registers at beginning of the shader thread.

Every vertex in unified storage 78 may already have a mapping table after its thread of the vertex shader stage is complete. Each of the vertices within an image geometry may have multiple attributes, and each attribute has one physical storage slot. Table 2 shown below illustrates an exemplary mapping table for a vertex, a primitive, or a pixel. The physical locations of the registers (I, J, . . . , n) may not be continuous and cannot be the same. Table 2 may comprise any of vertex attribute mapping table 72, primitive attribute mapping table 74, and pixel attribute mapping table 76.

TABLE 2

| Register ID | Physical Location |
|---|---|
| 0 | I |
| 1 | J |
| 2 | K |
| 3 | L |
| ... | |
| 15 | n |

Table 3 shown below illustrates exemplary setup thread information. Shared shader 18 may use vertex IDs to look up their own mapping table and retrieve physical addresses for the vertex attribute data. Similar information may be defined for other shader threads. For example, vertex shader threads have only one vertex ID, attribute interpolation shader threads have one primitive ID and one pixel ID, and fragment shader threads have only one pixel ID.

TABLE 3

| Information | Description |
|---|---|
| Primitive ID | Unique ID for primitive |
| Vertex0 ID | First vertex ID in vertex cache |
| Vertex1 ID | Second vertex ID in vertex cache |
| Vertex2 ID | Third vertex ID in vertex cache |
| Reference count | Initial reference count (usually = 1) |

After a thread is done for one shader stage, the mapping table for the output register may be kept for the next shader stage and stored in unified storage 78. The output register may be renamed to an input register. Table 4 shown below illustrates an exemplary binding table for output of a previous shader stage to input of the next shader stage.

TABLE 4

| Register ID | Output ID | Physical Location |
|---|---|---|
| 0 | k | I' |
| 1 | k + 1 | J' |
| 2 | k + 2 | K' |
| 3 | k + 3 | L' |
| ... | | |
| 15 | l − 1 | n' |

For physical allocation, occupancy table 79 that corresponds to unified storage 78 marks if every register or entry in unified storage 78 is occupied or not. Table 5 shown below illustrates an exemplary occupancy table. When a thread is scheduled into shared shader 18, shared shader 18 allocates a physical entry in unified storage 78 that is not occupied according to occupancy table 79 to the requested virtual register ID, and creates a mapping table.

To simplify the decision whether unified vertex cache and shader register file 16 has enough space for a new coming thread, a specific counter is designed. In this case, if the counter value is larger than or equal to the number of requested entries for the new thread, then shared shader 18 may receive the new thread. Otherwise, shared shader 18 will not receive the new thread. The counter may be initialized to a maximum size of the physical storage. When entries are allocated for a thread, the corresponding entries will be marked as occupied ("Yes"). Meanwhile the counter will be decremented by the number of entries allocated for the thread. When entries for a vertex, primitive or pixel are released, the corresponding entries will be marked as unoccupied ("No") and the counter will be incremented by the number of entries released.

TABLE 5

| Entry | Occupancy |
|---|---|
| 0 | Yes |
| 1 | No |
| 2 | No |
| 3 | Yes |
| ... | |
| 200 | Yes |
| 201 | No |
| ... | |
| NN | No |

Figure 5:
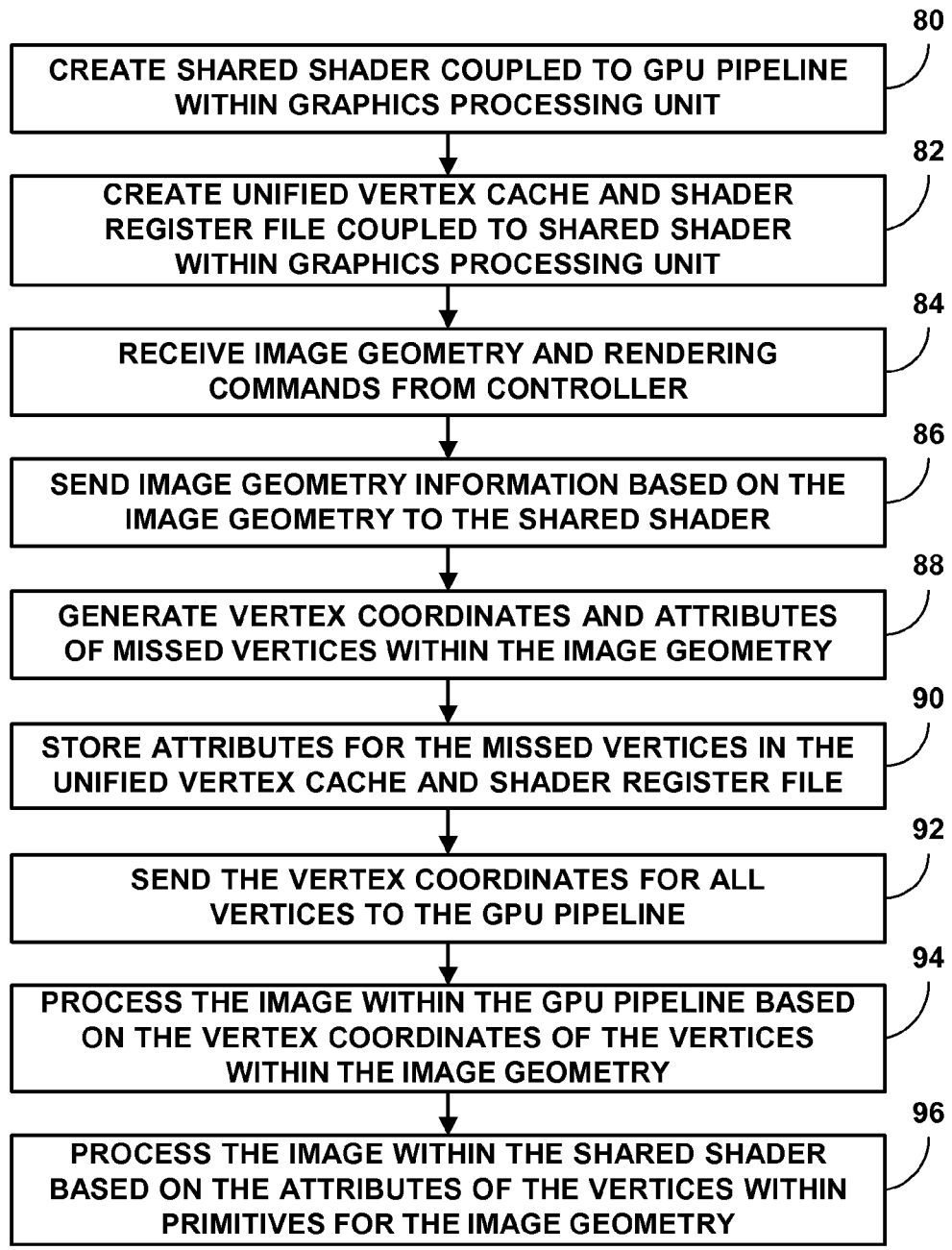
FIG. 5 is a flowchart illustrating an exemplary operation of processing a computerized image within a GPU using a unified vertex cache and shader register file.

FIG. 5 is a flowchart illustrating an exemplary operation of processing a computerized image within a GPU using a unified vertex cache and shader register file. The operation will be described herein in reference to GPU 14 from FIG. 1. Shared shader 18 may be created within GPU 14 during manufacture of device 10 and coupled to GPU pipeline 20 (80). Unified vertex cache and shader register file 16 may also be created within GPU 14 during manufacture of device 10 and coupled to shared shader 18 (82).

GPU 14 receives image geometry and rendering commands from controller 12 of device 10 (84). The image geometry may correspond to representations of complex, two-dimensional or three-dimensional computerized graphics. GPU 14 sends the image geometry and rendering commands to GPU pipeline 20 to process the image geometry for display on display device 20 connected to device 10. GPU pipeline 20 sends image geometry information based on the image geometry to shared shader 18 (86). The image geometry information may include vertex threads only for missed vertices within the image geometry.

Shared shader 18 generates vertex coordinates and attributes of missed vertices within the image geometry (88). Shared shader 18 then stores the attributes for the missed vertices in unified vertex cache and shader register file 16 (90). Shared shader 18 sends the vertex coordinates of all the vertices, hit and missed, back to GPU pipeline 20 (92). GPU pipeline 20 processes the image based on the vertex coordinates of each of the vertices in the image geometry (94). Shared shader 18 processes the image based on the vertex attributes of each of the vertices within primitives for the image geometry (96).

Figure 6:
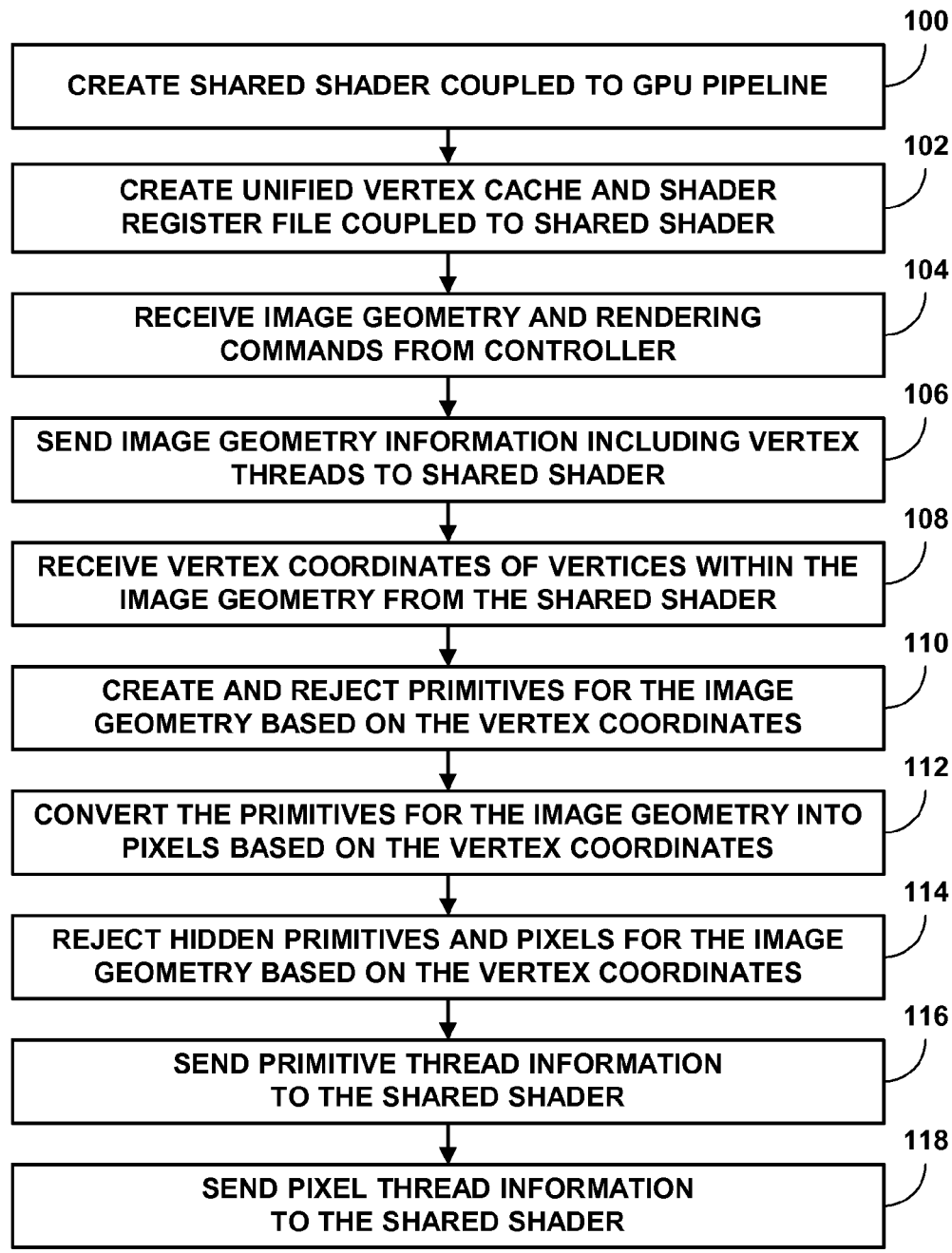
FIG. 6 is a flowchart illustrating an exemplary operation of processing a computerized image within a GPU pipeline coupled to a shared shader and a unified vertex cache and shader register file.

FIG. 6 is a flowchart illustrating an exemplary operation of processing a computerized image within a GPU pipeline coupled to a shared shader and a unified vertex cache and shader register file. The operation will be described herein in reference to GPU 14 from FIG. 3. Shared shader 18 may be created within GPU 14 during manufacture of device 10 and coupled to GPU pipeline 20 (100). Unified vertex cache and shader register file 16 may also be created within GPU 14 during manufacture of device 10 and coupled to shared shader 16 (102).

Command engine 42 receives image geometry and rendering commands from controller 12 of device 10 (104). The image geometry may correspond to representations of complex, two-dimensional or three-dimensional computerized graphics. Command engine 42 passes the image geometry and rendering commands along GPU pipeline 20 to the other processing stages. Vertex shader thread module 44 sends image geometry information that includes vertex threads to shared shader 18 (106). The vertex thread information may indicate only missed vertices within the image geometry.

Primitive setup and rejection module 46 within GPU pipeline 20 receives vertex coordinates that identify vertices within the image geometry (108). Primitive setup and rejection module 46 creates primitives with one or more vertices within the image geometry, and rejects primitives based on the XY coordinates of the vertices within the image geometry (110). Primitive setup and rejection module 46 may send primitive threads including setup and rejected primitive information to shared shader 18. Upon receiving the primitive threads, shared shader 18 may request release of storage space in unified vertex cache and shader register file 16 via virtual address map 17 for the attributes associated with the rejected primitives.

Rasterizer 48 converts the primitives of the image geometry into pixels based on the XY coordinates of the vertices within the primitives and the number of pixels included in the primitives (112). Hidden primitive and pixel rejection module 50 rejects hidden primitives and pixels for the image geometry based on the Z coordinates of the vertices within the primitives (114). Hidden primitive and pixel rejection module 50 may send primitive threads including rejected primitive information to shared shader 18. Upon receiving the primitive threads, shared shader 18 may request release of storage space in unified vertex cache and shader register file 16 via virtual address map 17 for the attributes associated with the rejected primitives.

Attribute gradient thread module 52 then sends primitive thread information to shared shader 18 to prompt shared shader 18 to perform attribute gradient setup (116). The primitive thread information may indicate primitives for the image geometry. In addition, attribute interpolation thread module 54 and fragment shader thread module 56 send pixel thread information to shared shader 18 to prompt shared shader 18 to perform attribute interpolation and pixel rendering (118). The pixel thread information may indicate pixels within the primitives for the image geometry.

Figure 7:
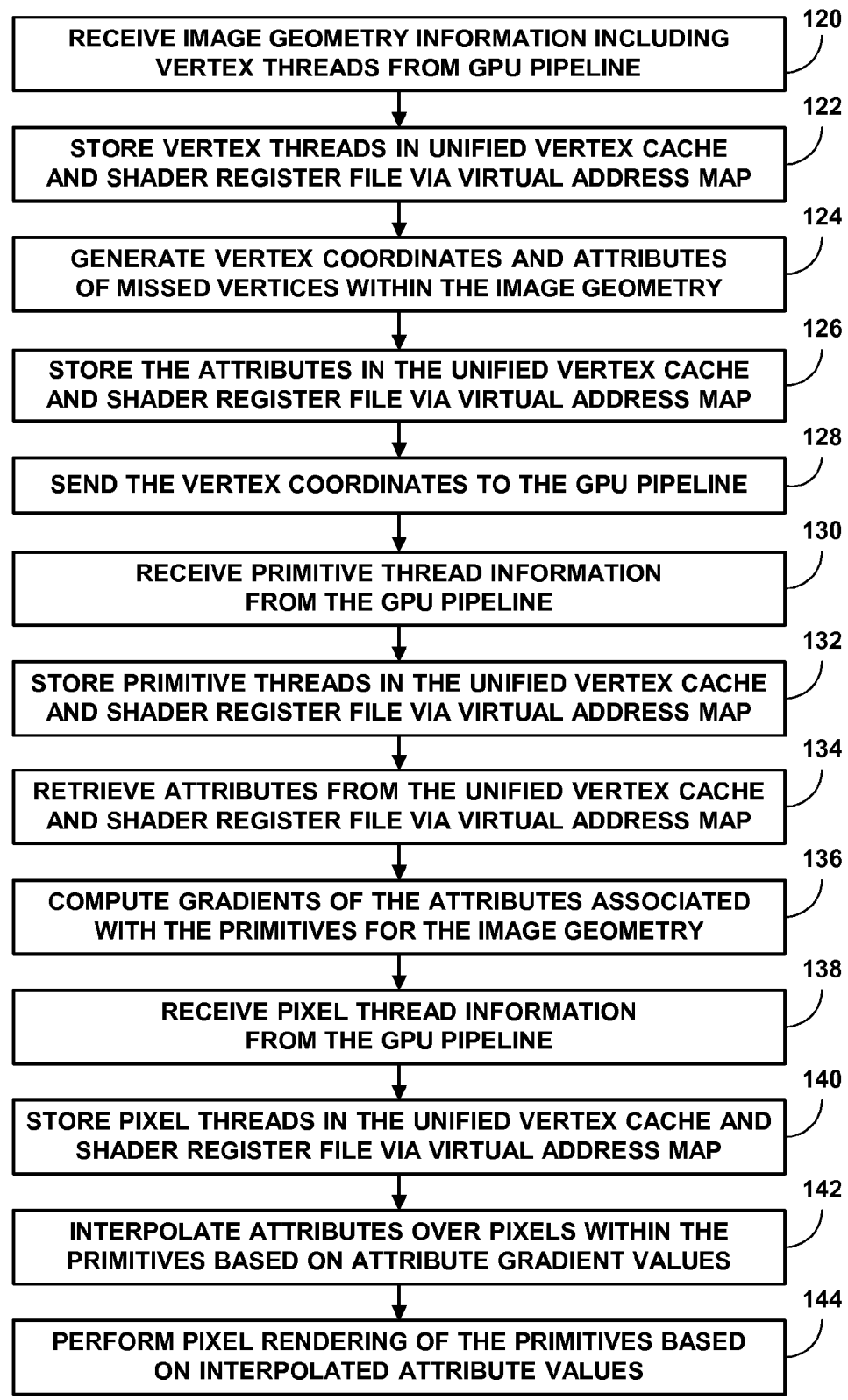
FIG. 7 is a flowchart illustrating an exemplary operation of processing a computerized image within a shared shader coupled to a GPU pipeline and a unified vertex cache and shader register file.

FIG. 7 is a flowchart illustrating an exemplary operation of processing a computerized image within a shared shader coupled to a GPU pipeline and a unified vertex cache and shader register file. The operation will be described herein in reference to GPU 14 from FIG. 3. In the embodiment illustrated in FIG. 7, shared shader 18 combines the shader cores for a vertex shader, an attribute gradient setup module, an attribute interpolator, and a fragment shader. Shared shader 18 receives image geometry information that includes vertex threads from vertex shader thread module 44 within GPU pipeline 20 (120). The vertex thread information may indicate only missed vertices within the image geometry. Shared shader 18 stores the vertex threads in unified vertex cache and shader register file 16 via virtual address map 17 (122).

Shared shader 18 is applied to the image geometry information and generates vertex coordinates and attributes of missed vertices within the image geometry (124). Shared shader 18 then stores the attributes for the missed vertices in unified vertex cache and shader register file 16 via virtual address map 17 (126). Shared shader 18 does not generate vertex coordinates and attributes of hit vertices within the image geometry as vertex coordinates and attributes of the hit vertices were previously generated and stored in unified vertex cache and shader register file 16. Shared shader 18 then sends the vertex coordinates that identify all the vertices, hit and missed, within the image geometry to primitive setup and rejection module 48 within GPU pipeline 20 (128).

Shared shader 18 receives primitive thread information from attribute gradient thread module 52 within GPU pipeline 20 (130). The primitive thread information may indicate primitives for the image geometry. Shared shader 18 stores the primitive threads in unified vertex cache and shader register file 16 via virtual address map 17 (132). Shared shader 18 retrieves the vertex attributes of the vertices within the primitives from unified vertex cache and shader register file 16 via virtual address map 17 (134). Shared shader 18 computes gradients of attributes associated with the primitives for the image geometry (136). After shared shader 18 computes gradients of attributes of all vertices within a primitive for the image geometry, shared shader 18 may request release of storage space in unified vertex cache and shader register file 16 via virtual address map 17 for the attributes associated with the primitives.

Once the attribute gradient values are computed, shared shader 18 receives pixel thread information from attribute interpolation thread module 54 and fragment shader thread module 56 within GPU pipeline 20 (138). The pixel thread information may indicate pixels within the primitives for the image geometry. Shared shader 18 stores the pixel threads in unified vertex cache and shader register file 16 via virtual address map 17 (140). Shared shader 18 interpolates the attributes over the pixels within the primitives based on the attribute gradient values (142).

Shared shader 18 then performs fragment shading to render pixels of the primitives for the image geometry based on the interpolated attribute values (144). Shared shader 18 determines surface properties of the computerized image at pixels within the primitives for the image geometry. Results of shared shader 18 will be output to post-processor 58 for presentation of the processed image on display device 8 coupled to device 10.

Figure 8:
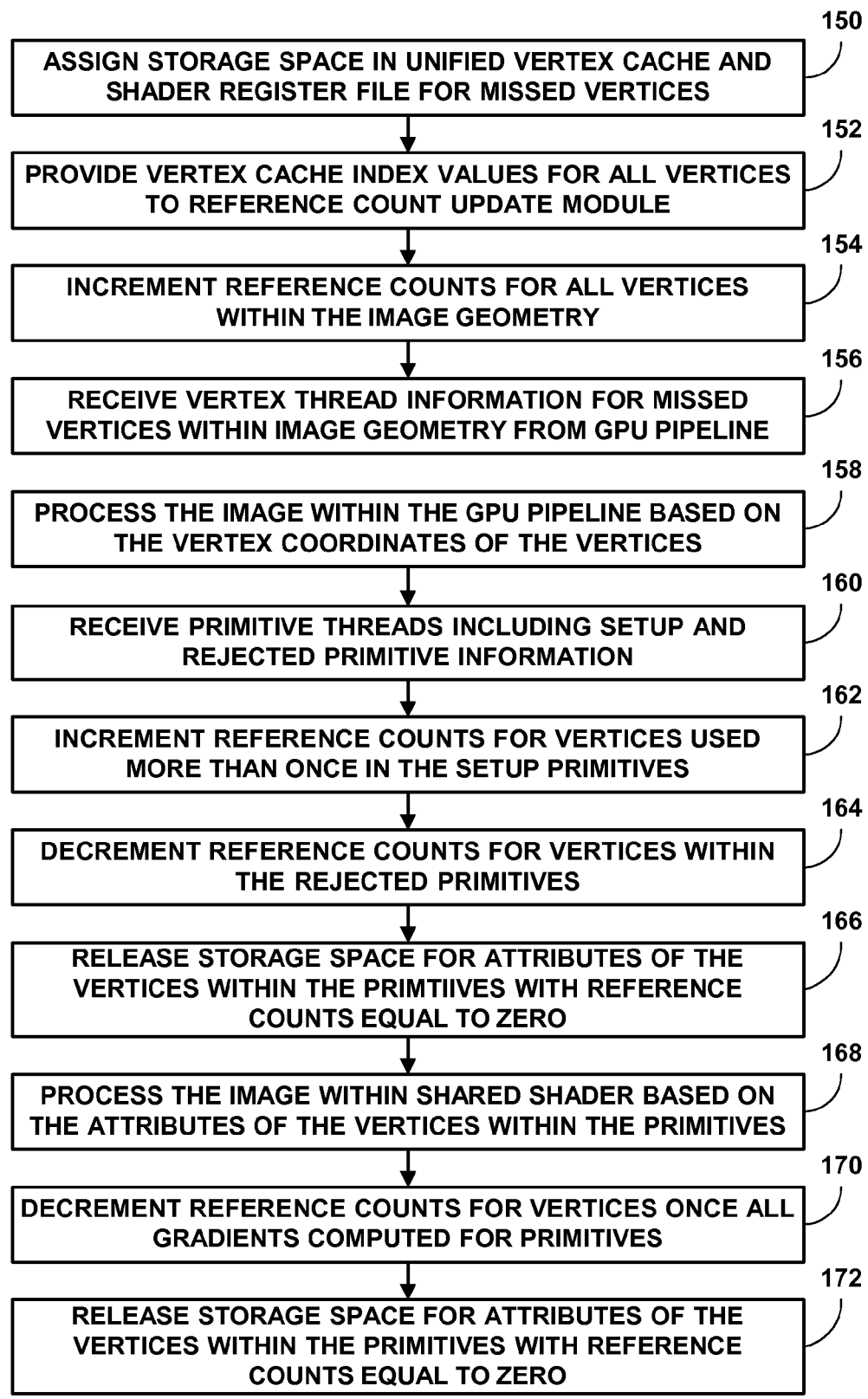
FIG. 8 is a flowchart illustrating an exemplary operation of processing of vertices within an image geometry within a shared shader.

FIG. 8 is a flowchart illustrating an exemplary operation of processing of vertices within an image geometry within a shared shader. The operation will be described herein in reference to GPU 14 from FIG. 3. Virtual address map 17 including reference count update module 39, and unified vertex cache and shader register file 16 including reference count storage 40 and storage release module 42 may be created within GPU 14 during manufacture of device 10 and coupled to shared shader 18.

Command engine 42 sends vertex indices for vertices within the image geometry to vertex decision module 45 within vertex shader thread module 44. Vertex decision module 45 determines whether each of the vertices within the image geometry are hit vertices or missed vertices. In the case of missed vertices, vertex shader thread module 44 assigns vertex cache index values to each of the missed vertices that indicate storage locations of vertex coordinates and attributes for the missed vertices in unified vertex cache and shader register file 16 (150).

Vertex decision module 45 then provides the vertex cache index values that indicate storage locations in unified vertex cache and shader register file 16 of the vertex coordinates and attributes for each of the vertices, hit or missed, to reference count update module 39 within virtual address map 17 via shared shader 18 (152). Upon receiving the vertex cache index values for the missed vertices, reference count update module 39 initializes reference counts within reference count storage 40 for each of the missed vertices to zero. Reference count update module 39 then increments the reference counts within reference count storage 40 for all the vertices, hit and missed, within the image geometry by one (154).

Vertex shader thread module 44 reads information for the missed vertices and forms vertex threads based on the information for the missed vertices within the image geometry. Shared shader 18 receives the vertex thread information for the missed vertices from vertex shader thread module 44 within GPU pipeline 20 (156). Shared shader 18 is applied to each of the missed vertices and generates vertex coordinates and attributes of the missed vertices within the image geometry. Shared shader 18 then stores the vertex coordinates and attributes for the missed vertices at the assigned storage locations in unified vertex cache and shader register file 16. Shared shader 18 then sends only the vertex coordinates of all the vertices, hit and missed, within the image geometry back to GPU pipeline 20. GPU pipeline 20 processes the image based on the vertex coordinates for each of the vertices within the image geometry (158).

Shared shader 18 receives primitive threads including setup and rejection primitive information from primitive setup and rejection module 46 within GPU pipeline 20 (160). When shared shader 18 receives setup primitive information for a primitive in which each of the vertices are only used once, reference counts within reference count storage 40 for the vertices are not incremented and remain unchanged. When shared shader 18 receives setup primitive information for a primitive in which at least one of the vertices is used more than once, a reference count within reference count storage 40 for the at least one vertex is incremented by one each time the vertex is reused (162).

When shared shader 18 receives rejected primitive information, shared shader 18 sends a request to storage release module 41 via virtual address map 17 to release storage space in unified vertex cache and shader register 16 for the attributes of the vertices within the rejected primitive. Upon receiving the request, storage release module 41 decrements reference counts within reference count storage 40 for the vertices within the rejected primitive by one (164). If the reference counts within reference count storage 40 are decremented to zero, storage release module 41 releases the storage space in unified vertex cache and shader register file 16 for the attributes of the vertices within the rejected primitive (166). Primitive setup and rejection module 46 then passes the vertex coordinates for each of the vertices in the image geometry along GPU pipeline 20. The processing stages within GPU pipeline 20 process the image based on the vertex coordinates for the vertices within the image geometry as described above.

Attribute gradient thread module 52 sends primitive thread information to shared shader 18 to prompt shared shader 18 to perform attribute gradient setup. Shared shader 18 retrieves the vertex attributes of each of the vertices within primitives for the image geometry from unified vertex cache and shader register file 16 via virtual address map 17, and processes the image based on the retrieved attributes (168).

After shared shader 18 computes gradients of attributes of all vertices within a primitive for the image geometry, shared shader 18 sends a request to storage release module 41 via virtual address map 17 to release storage space in unified vertex cache and shader register file 16 for the attributes of the vertices within the primitive. Upon receiving the request, storage release module 41 decrements reference counts within reference count storage 40 for the vertices within the primitive by one (170). If the reference counts within reference count storage 40 are decremented to zero, storage release module 41 releases the storage space in unified vertex cache and shader register file 16 for the attributes of the vertices within the primitive (172).

Figure 9:
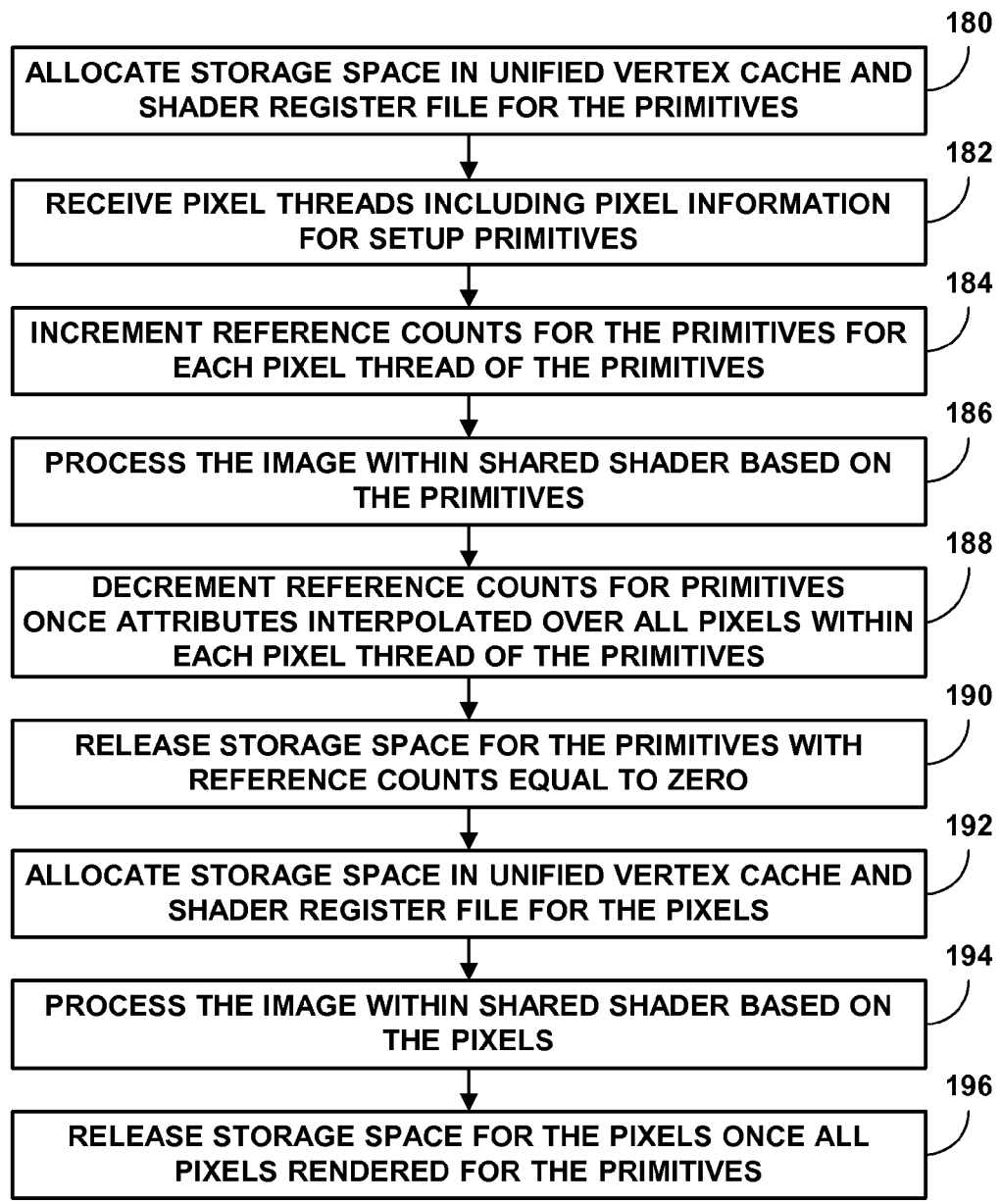
FIG. 9 is a flowchart illustrating an exemplary operation of processing of primitives for an image geometry within a shared shader.

FIG. 9 is a flowchart illustrating an exemplary operation of processing of primitives for an image geometry within a shared shader. The operation will be described herein in reference to GPU 14 from FIG. 3. Virtual address map 17 including reference count update module 39, and unified vertex cache and shader register file 16 including reference count storage 40 and storage release module 42 may be created within GPU 14 during manufacture of device 10 and coupled to shared shader 18.

Attribute interpolation thread module 54 within GPU pipeline 18 forms a stream of pixel threads for each of the primitives not rejected by primitive setup and rejection module 46 or hidden primitive and pixel rejection module 50. After computing the attribute gradient values, virtual address map 17 allocates storage space in unified vertex cache and shader register file 16 for the primitives in response to a request from shared shader 18 (180). Shared shader 18 then provides cache index values that indicate storage locations in unified vertex cache and shader register file 16 of the primitives to reference count update module 39 within virtual address map 17. Upon receiving the cache index values for the primitives, reference count update module 39 initializes reference counts within reference count storage 40 for each of the primitives to zero.

Shared shader 18 then receives the pixel thread information from attribute interpolation thread module 54 and fragment shader thread module 56 (182). Reference count update module 39 then increments the reference counts within reference count storage 40 for each of the primitives by one for each pixel thread generated for the primitive (184).

Shared shader 18 then processes the image based on the primitives (186). After shared shader 18 interpolates the attributes over all the pixels within each of the pixel threads of the primitives, shared shader 18 sends a request to storage release module 41 via virtual address map 17 to release storage space in unified vertex cache and shader register file 16 for the primitives. Upon receiving the request, storage release module 41 decrements reference counts within reference count storage 40 for each of the primitives by one for each of the completed pixel threads (188). If the reference counts within reference count storage 40 are decremented to zero, storage release module 41 releases the storage space in unified vertex cache and shader register file 16 for the primitives (190).

After completing attribute interpolation for each of the pixel threads, virtual address map 17 allocates storage space in unified vertex cache and shader register file 16 for the pixels within the primitives in response to a request of shared shader 18 (192). Shared shader 18 then processes the image based on the pixels of the primitives for the image geometry (194). In this way, shared shader 18 renders pixels of the primitives based on the interpolated attribute values. After shared shader 18 renders the pixels within the primitives, shared shader 18 sends a request to storage release module 41 via virtual address map 17 to release storage space in unified vertex cache and shader register file 16 for the pixels. Upon receiving the request, storage release module 41 releases the storage space in unified vertex cache and shader register file 16 for the pixels within the primitives (196). Results of shared shader 18 will be output to a post-processor 58 for presentation of the processed image on display device 8.

A number of embodiments have been described. However, various modifications to these embodiments are possible, and the principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modern chip or chipset that is configured to control operations of various devices of a personal communications device such as a cellular telephone.

The techniques described in this disclosure may be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

As further examples, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

In this disclosure, various techniques have been described for processing computerized images with a GPU using a unified vertex cache and shader register file. The techniques include creating a shared shader coupled to the GPU pipeline and a unified vertex cache and shader register file coupled to the shared shader to substantially eliminate data movement within the GPU pipeline. The shared shader combines shader cores for a vertex shader and a fragment shader. In some cases, the shared shader may also combine shader cores for an attribute gradient setup module and an attribute interpolator. The unified vertex cache and shader register file stores attributes for vertices within the image geometry and acts as a unified register file for the shared shader.

According to the techniques described herein, when the GPU receives an image geometry for an image, the GPU pipeline sends image geometry information based on the image geometry to the shared shader. The shared shader stores attributes for vertices within the image geometry in the unified vertex cache and shader register file. The shared shader sends only vertex coordinates of the vertices within the image geometry back to the GPU pipeline. The shared shader may perform vertex shading to generate vertex coordinates and attributes of at least a portion of the vertices in the image geometry. The GPU pipeline processes the image by performing primitive setup and rejection based on the vertex coordinates. The GPU pipeline then prompts the shared shader to process the image by performing attribute gradient setup based on the vertex attributes. The shared shader retrieves the vertex attributes from the unified vertex cache and shader register file to perform attribute gradient setup.

The GPU pipeline also prompts the shared shader to process the image by performing attribute interpolation and pixel rendering based on the vertex attributes. The shared shader performs attribute interpolation. The shared shader then performs fragment shading to render pixels within the primitives for the image geometry and sends the processed pixel information to a post-processor for presentation of the image on a display device. Therefore, the vertex attributes are never introduced to the GPU pipeline. In this way, the GPU pipeline only moves the primitives for the image geometry and the vertex coordinates that identify each of the vertices within the primitives. In addition, the techniques may reduce the area of the GPU by combining all the shader cores into the shared shader and combing all the individual shader register files and vertex caches into the unified vertex cache and shader register file.

The invention claimed is:

1. A method comprising:
receiving image geometry information based on an image geometry for an image within a shared shader coupled to a graphics processing unit (GPU) pipeline included in a GPU;
storing attributes for vertices in the image geometry in a plurality of physical locations in a unified storage coupled to the shared shader via a virtual address map, wherein the physical locations in the unified storage are virtually addressed as shader register file locations;
sending vertex coordinates that identify the vertices in the image geometry to the GPU pipeline;
processing the image within the GPU pipeline based on the vertex coordinates;
addressing the physical locations in the unified storage as vertex cache locations; and
processing the image within the shared shader by reading the attributes of the vertices in the image geometry from the vertex cache locations in the unified storage.

2. The method of claim 1, further comprising:
receiving the image geometry for the image within the GPU pipeline; and
sending the image geometry information including vertex thread information that indicates vertices within the image geometry not included in the unified storage to the shared shader.

3. The method of claim 1, further comprising generating vertex coordinates and attributes of vertices in the image geometry not included in the unified storage by performing vertex shading within the shared shader.

4. The method of claim 1, further comprising:
receiving the image geometry information including vertex threads for the image geometry within the shared shader;
storing the vertex threads for the image geometry in the unified storage via the virtual address map;
determining which of the vertices within the image geometry comprise hit vertices included in the unified storage based on vertex indices of the vertices;

determining which of the vertices within the image geometry comprise missed vertices not included in the unified vertex cache and register file based on the vertex indices of the vertices; and generating vertex coordinates and attributes of each of the missed vertices within the image geometry.

5. The method of claim 4, further comprising:

maintaining stored attributes for each of the hit vertices within the image geometry at storage locations in the unified storage indicated by vertex cache index values;

assigning vertex cache index values that indicate storage locations of attributes in the unified storage for each of the missed vertices within the image geometry; and storing generated attributes for each of the missed vertices at the assigned storage locations in the unified storage.

6. The method of claim 1, further comprising incrementing references counts in a reference count storage included in the unified storage via the virtual address map for each of the vertices within the image geometry.

7. The method of claim 1, wherein processing the image within the GPU pipeline comprises:

creating primitives with one or more vertices within the image geometry; and rejecting a first subset of the primitives that are unnecessary for the image based on the vertex coordinates.

8. The method of claim 7, further comprising:

sending primitive threads including setup primitive information to the shared shader; and incrementing reference counts in a reference count storage included in the unified storage via the virtual address map for vertices used more than once within the setup primitives.

9. The method of claim 7, wherein rejecting the first subset of the primitives comprises:

rejecting invisible primitives for the image geometry using backface culling and scissoring based on the vertex coordinates; and rejecting hidden primitives and hidden pixels within primitives for the image geometry using early depth and stencil test based on the vertex coordinates.

10. The method of claim 7, further comprising:

sending primitive threads including rejected primitive information to the shared shader; and requesting release of storage space in the unified storage for attributes associated with the rejected first subset of the primitives within the shared shader via the virtual address map.

11. The method of claim 10, further comprising:

decrementing reference counts for vertices within the first subset of the primitives upon receiving the request to release storage space in the unified storage; and releasing storage space in the unified storage for the attributes of the vertices within the first subset of the primitives when the reference counts for the vertices are decremented to zero.

12. The method of claim 7, wherein processing the image within the GPU pipeline further comprises:

prompting the shared shader to perform attribute gradient setup of attributes associated with a second subset of the primitives that are necessary for the image by sending primitive threads that indicate the second subset of the primitives to the shared shader; and prompting the shared shader to perform attribute interpolation for the second subset of the primitives by sending pixel threads that indicate pixels within the second subset of the primitives to the shared shader.

13. The method of claim 12, further comprising converting the primitives for the image geometry into pixels based on the vertex coordinates prior to prompting the shared shader to perform attribute gradient setup of the attributes associated with the second subset of the primitives.

14. The method of claim 1, wherein processing the image within the shared shader comprises:

retrieving the vertex attributes of each of the vertices within a subset of the primitives that are necessary for the image from the unified storage via the virtual address map; and computing gradients of attributes associated with the subset of primitives for the image geometry based on the attributes retrieved from the unified storage.

15. The method of claim 14, wherein processing the image within the shared shader further comprises:

receiving primitive threads that indicate the subset of the primitives for the image geometry from the GPU pipeline; and storing the primitive threads for the image geometry in the unified storage via the virtual address map.

16. The method of claim 14, further comprising requesting release of storage space in the unified storage for the attributes associated with the subset of the primitives for the image geometry via the virtual address map after computing the gradients of all the attributes associated with the subset of the primitives.

17. The method of claim 16, further comprising:

decrementing reference counts for the vertices within the subset of primitives upon receiving the request to release storage space in the unified storage; and releasing storage space in the unified storage for attributes of the vertices within the subset of the primitives when the reference counts for the vertices are decremented to zero.

18. The method of claim 14, wherein processing the image within the shared shader comprises:

interpolating the attributes over pixels within the subset of the primitives for the image geometry based on attribute gradient values just after computing the gradients of the attributes associated with the subset of the primitives; and performing pixel rendering of the subset of the primitives for the image geometry based on interpolated attribute values.

19. The method of claim 18, wherein processing the image within the shared shader further comprises:

receiving pixel threads that indicate pixels within the subset of the primitives that are necessary for the image from the GPU pipeline; and storing the pixel threads for the image in the unified storage via the virtual address map.

20. The method of claim 18, further comprising:

storing the subset of the primitives for the image geometry in the unified storage coupled to the shared shader via the virtual address map; and requesting release of storage space in the unified storage for the subset of the primitives for the image geometry via the virtual address map after interpolating the attributes over the pixels within the subset of the primitives.

21. The method of claim 20, further comprising:

incrementing references counts in a reference count storage included in the unified storage via the virtual address map for the subset of the primitives;

decrementing the reference counts for the subset of the primitives upon receiving the request to release storage space in the unified storage; and releasing storage space in the unified storage for the subset of the primitives when the reference counts for the primitives are decremented to zero.

22. The method of claim 18, further comprising:
storing the pixels within the subset of the primitives for the image geometry in the unified storage coupled to the shared shader via the virtual address map; and
requesting release of storage space in the unified storage for the pixels within the subset of the primitives for the image geometry via the virtual address map after rendering the pixels within the subset of the primitives.

23. The method of claim 1,
wherein processing the image within the GPU pipeline comprises performing primitive setup and primitive rejection for the image geometry based on the vertex coordinates of the vertices within the image geometry; and
wherein processing the image within the shared shader comprises retrieving the attributes of the vertices within primitives for the image geometry from the unified storage via the virtual address map and performing attribute gradient setup, attribute interpolation, and fragment shading based on the attributes associated with the primitives.

24. The method of claim 1, further comprising utilizing the unified storage as a unified register file for the shared shader that combines an input register file, a temporary register file, and an output register file.

25. The method of claim 1, further comprising:
mapping vertex cache locations and virtual register addresses to the physical locations within the unified storage via the virtual address map; and
handling release and allocation of storage space for vertex attributes and threads within the unified storage via the virtual address map.

26. A non-transitory computer-readable medium comprising instructions that cause a programmable processor to:
receive image geometry information based on an image geometry for an image within a shared shader coupled to a graphics processing unit (GPU) pipeline included in a GPU;
store attributes for vertices in the image geometry in a plurality of physical locations in a unified storage coupled to the shared shader via a virtual address map, wherein the physical locations in the unified storage are virtually addressed as shader register file locations;
send vertex coordinates that identify the vertices in the image geometry to the GPU pipeline;
process the image within the GPU pipeline based on the vertex coordinates;
addressing the physical locations in the unified storage as vertex cache locations; and
process the image within the shared shader by reading the attributes of the vertices in the image geometry from the vertex cache locations in the unified storage.

27. The computer-readable medium of claim 26, further comprising instructions that cause the programmable processor to:
receive the image geometry for the image within the GPU pipeline; and
send the image geometry information including vertex thread information that indicates vertices within the image geometry not included in the unified storage to the shared shader.

28. The computer-readable medium of claim 26, wherein the instructions cause the programmable processor to:
receive the image geometry information including vertex threads for the image geometry within the shared shader;
determine which of the vertices within the image geometry comprise hit vertices included in the unified storage based on vertex indices of the vertices;
determine which of the vertices within the image geometry comprise missed vertices not included in the unified vertex cache and register file based on the vertex indices of the vertices; and
generate vertex coordinates and attributes of each of the missed vertices within the image geometry.

29. The computer-readable medium of claim 28, further comprising instructions that cause the programmable processor to:
maintain stored attributes for each of the hit vertices within the image geometry at storage locations in the unified storage indicated by vertex cache index values;
assign vertex cache index values that indicate storage locations of attributes in the unified storage for each of the missed vertices within the image geometry; and
store generated attributes for each of the missed vertices at the assigned storage locations in the unified storage.

30. The computer-readable medium of claim 26, wherein the instructions cause the programmable processor to:
create primitives with one or more vertices within the image geometry; and
reject a first subset of the primitives that are unnecessary for the image based on the vertex coordinates to process the image within the GPU pipeline.

31. The computer-readable medium of claim 30, further comprising instructions that cause the programmable processor to:
send primitive threads including rejected primitive information to the shared shader; and
request release of storage space in the unified storage for attributes associated with the first subset of the primitives within the shared shader via the virtual address map.

32. The computer-readable medium of claim 30, wherein the instructions cause the programmable processor to:
prompt the shared shader to perform attribute gradient setup of attributes associated with a second subset of the primitives that are necessary for the image by sending primitive threads that indicate the second subset of the primitives for the image geometry to the shared shader; and
prompt the shared shader to perform attribute interpolation for the second subset of the primitives by sending pixel threads that indicate pixels within the second subset of the primitives to the shared shader.

33. The computer-readable medium of claim 26, wherein the instructions cause the programmable process to:
retrieve the vertex attributes of each of the vertices within a subset of the primitives that are necessary for the image from the unified storage via the virtual address map; and
compute gradients of attributes associated with the subset of primitives for the image geometry based on the attributes retrieved from the unified storage to process the image within the shared shader.

34. The computer-readable medium of claim 33, further comprising instructions that cause the programmable processor to request the unified storage to release storage space for the attributes associated with the subset of the primitives for the image geometry via the virtual address map after computing the gradients of all the attributes associated with the subset of the primitives.

35. The computer-readable medium of claim 33, wherein the instructions cause the programmable processor to:
  interpolate the attributes over pixels within the subset of the primitives for the image geometry based on attribute gradient values just after computing the gradients of the attributes associated with the subset of the primitives; and
  perform pixel rendering of the subset of the primitives for the image geometry based on interpolated attribute values.

36. The computer-readable medium of claim 35, further comprising instructions that cause the programmable processor to:
  store the subset of the primitives for the image geometry in the unified storage coupled to the shared shader via the virtual address map; and
  request release of storage space in the unified storage for the subset of the primitives for the image geometry via the virtual address map after interpolating the attributes over the pixels within the subset of the primitives.

37. The computer-readable medium of claim 35, further comprising instructions that cause the programmable processor to:
  store the pixels within the subset of the primitives for the image geometry in the unified storage coupled to the shared shader via the virtual address map; and
  request release of storage space in the unified storage for the pixels within the subset of the primitives for the image geometry via the virtual address map after rendering the pixels within the subset of the primitives.

38. The computer-readable medium of claim 26, further comprising instructions that cause the programmable processor to:
  map vertex cache locations and virtual register addresses to the physical locations within the unified storage via the virtual address map; and
  handle release and allocation of storage space for vertex attributes or threads within the unified storage via the virtual address map.

39. A device comprising:
  a graphics processing unit (GPU) pipeline that receives an image geometry for an image;
  a shared shader coupled to the GPU pipeline that receives image geometry information based on the image geometry from the GPU pipeline, and sends vertex coordinates that identify vertices in the image geometry to the GPU pipeline; and
  a unified storage comprising a plurality of physical locations configured to provide vertex cache locations and shader register file locations, wherein the physical locations in the unified storage are virtually addressed as shader register file locations, and wherein the physical locations in the unified storage are addressed as vertex cache locations,
  wherein the unified storage is coupled to the shared shader that stores attributes for each of the vertices in the image geometry to the physical locations via a virtual address map, and
  wherein the GPU pipeline processes the image based on the vertex coordinates, and the shared shader processes the image by reading the attributes of the vertices within the image geometry from the physical locations stored in the unified storage.

40. The device of claim 39, wherein the GPU pipeline includes a vertex shader thread module that receives the image geometry and sends the image geometry information including vertex thread information that indicates vertices within the image geometry not included in the unified storage to the shared shader.

41. The device of claim 39, wherein the shared shader generates vertex coordinates and attributes of vertices within the image geometry not included in the unified storage by performing vertex shading.

42. The device of claim 39, wherein the shared shader:
  receives the image geometry information including vertex threads for the image geometry;
  stores the vertex threads for the image geometry in the unified storage via the virtual address map;
  determines which of the vertices within the image geometry comprise hit vertices included in the unified storage based on vertex indices of the vertices;
  determines which of the vertices within the image geometry comprise missed vertices not included in the unified storage based on the vertex indices of the vertices; and
  generates vertex coordinates and attributes of each of the missed vertices within the image geometry.

43. The device of claim 42,
  wherein the virtual address map assigns vertex cache index values that indicate storage locations of attributes in the unified storage for each of the missed vertices within the image geometry; and
  wherein the unified storage maintains stored attributes for each of the hit vertices within the image geometry at storage locations indicated by vertex cache index values, and stores generated attributes for each of the missed vertices at the assigned storage locations.

44. The device of claim 39, wherein the unified storage includes a reference count storage, and wherein the virtual address map includes a reference count update module that increments references counts in the reference count storage for each of the vertices within the image geometry.

45. The device of claim 39, wherein the GPU pipeline includes:
  a primitive setup and rejection module that creates primitives with one or more vertices within the image geometry and rejects a first subset of the primitives that are unnecessary for the image based on the vertex coordinates; and
  a hidden primitive and pixel rejection module that rejects a second subset of the primitives that are unnecessary for the image based on the vertex coordinates.

46. The device of claim 45,
  wherein the primitive setup and rejection module sends primitive threads including setup primitive information to the shared shader; and
  wherein the shared shader increments reference counts in a reference count storage included in the unified storage via the virtual address map for vertices used more than once within the setup primitives.

47. The device of claim 45,
  wherein the primitive setup and rejection module rejects invisible primitives for the image geometry using back-face culling and scissoring based on the vertex coordinates; and
  wherein the hidden primitive and pixel rejection module rejects hidden primitives and hidden pixels within primitives for the image geometry using early depth and stencil test based on the vertex coordinates.

48. The device of claim 47,
  wherein the primitive setup and rejection module sends primitive threads including rejected primitive information to the shared shader; and wherein the shared shader requests release of storage space in the unified storage for attributes associated with the first and second subsets of the primitives via the virtual address map.

49. The device of claim 48, wherein the unified storage includes a storage release module that:
  decrements reference counts for vertices within the first and second subsets of the primitives upon receiving the request to release storage space in the unified storage; and
  releases storage space in the unified storage for the attributes of the vertices within the first and second subset of the primitives when the reference counts for the vertices are decremented to zero.

50. The device of claim 45, wherein the GPU pipeline includes:
  an attribute gradient thread module that prompts the shared shader to perform attribute gradient setup of attributes associated with a third subset of the primitives that are necessary for the image by sending primitive threads that indicate the third subset of the primitives to the shared shader; and
  an attribute interpolation thread module and a fragment shader thread module that prompt the shared shader to perform attribute interpolation for the third subset of the primitives by sending pixel threads that indicate pixels within the third subset of the primitives to the shared shader.

51. The device of claim 45, wherein the GPU pipeline includes a rasterizer that converts the primitives for the image geometry into pixels based on the vertex coordinates before the attribute gradient thread module prompts the shared shader to perform attribute gradient setup of the attributes associated with the third subset of the primitives.

52. The device of claim 39, wherein the shared shader retrieves the attributes of each of the vertices within a subset of the primitives that are necessary for the image from the unified storage via the virtual address map, and computes gradients of attributes associated with the subset of primitives for the image geometry based on the attributes retrieved from the unified storage.

53. The device of claim 52, wherein the shared shader receives primitive threads that indicate the subset of the primitives for the image geometry, and stores the primitive threads for the image geometry in the unified storage via the virtual address map.

54. The device of claim 52, wherein the shared shader requests release of storage space in the unified storage for the attributes associated with the subset of the primitives for the image geometry via the virtual address map after the shared shader computes the gradients of all the attributes associated with the subset of the primitives.

55. The device of claim 54, wherein the unified storage includes a storage release module that:
  decrements reference counts for the vertices within the subset of primitives upon receiving the request to release storage space in the unified storage; and
  releases storage space in the unified storage for attributes of the vertices within the subset of the primitives when the reference counts for the vertices are decremented to zero.

56. The device of claim 52, wherein the shared shader:
  interpolates the attributes over pixels within the subset of the primitives for the image geometry based on attribute gradient values just after computing the gradients of the attributes associated with the subset of the primitives; and
  performs pixel rendering of the subset of the primitives for the image geometry based on interpolated attribute values.

57. The device of claim 56, wherein the shared shader receives pixel threads that indicate pixels within the subset of the primitives for the image geometry, and store the pixel threads for the image geometry in the unified storage via the virtual address map.

58. The device of claim 56,
  wherein the unified storage coupled to the shared shader stores the subset of the primitives for the image geometry via the virtual address map; and
  wherein the shared shader requests release of storage space in the unified storage for the subset of the primitives for the image geometry via the virtual address map after interpolating the attributes over the pixels within the subset of the primitives.

59. The device of claim 58,
  wherein the unified storage includes a reference count storage and the virtual address map includes a reference count update module that increments references counts in the reference count storage for the subset of the primitives; and
  wherein the unified storage includes a storage release module that decrements the reference counts for the subset of the primitives upon receiving the request to release storage space in the unified storage, and releases storage space in the unified storage for the subset of the primitives when the reference counts for the primitives are decremented to zero.

60. The device of claim 56, further comprising:
  wherein the unified storage coupled to the shared shader stores the pixels within the subset of the primitives for the image geometry via the virtual address map; and
  wherein the shared shader requests release of storage space in the unified storage for the pixels within the subset of the primitives for the image geometry via the virtual address map after rendering the pixels within the subset of the primitives.

61. The device of claim 39,
  wherein the GPU pipeline performs primitive setup and primitive rejection for the image geometry based on the vertex coordinates of the vertices within the image geometry; and
  wherein the shared shader retrieves the attributes of the vertices within primitives for the image geometry from the unified storage via the virtual address map, and performs attribute gradient setup, attribute interpolation, and fragment shading based on the attributes associated with the primitives.

62. The device of claim 39, wherein the unified storage comprises a unified register file for the shared shader that combines an input register file, a temporary register file, and an output register file.

63. The device of claim 39, wherein the virtual address map maps vertex cache locations and virtual register addresses to the physical locations within the unified storage, and handles release and allocation of storage space for vertex attributes or threads within the unified storage.

64. The device of claim 39, wherein the virtual address map comprises:
  shader register footprint tables;
  entity tables that maintain reference counts; and
  attribute mapping tables that map virtual storage locations of the attributes within the register tables and entity tables to the physical locations of the attributes within the unified storage.

* * * * *